US010970674B2

(12) United States Patent
Hicks et al.

(10) Patent No.: US 10,970,674 B2
(45) Date of Patent: *Apr. 6, 2021

(54) MOBILE TABLET GUN SYSTEM WITH MOBILE TABLET HAVING A MOBILE POS AND ENTERPRISE RESOURCE PLANNING APPLICATION FOR POS CUSTOMER ORDER FULFILLMENT AND IN-STORE INVENTORY MANAGEMENT FOR RETAIL ESTABLISHMENT

(71) Applicant: Retail Technologies Corporation, Orlando, FL (US)

(72) Inventors: Bruce J Hicks, Windermere, FL (US); James F Morris, Huntsville, AL (US); Brian K McWhirter, Winter Garden, FL (US); DeVan McArthur, Gulf Breeze, FL (US)

(73) Assignee: RETAILTECHNOLOGIES CORPORATION, Orlando, FL (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/371,246

(22) Filed: Apr. 1, 2019

(65) Prior Publication Data

US 2019/0228374 A1 Jul. 25, 2019

Related U.S. Application Data

(63) Continuation-in-part of application No. 13/783,058, filed on Mar. 1, 2013, now Pat. No. 10,453,047.
(Continued)

(51) Int. Cl.
*G06Q 10/08* (2012.01)
*G06K 7/00* (2006.01)
(Continued)

(52) U.S. Cl.
CPC ......... *G06Q 10/087* (2013.01); *G06K 7/0004* (2013.01); *G06K 7/10881* (2013.01); *G06Q 20/204* (2013.01); *G07F 7/0886* (2013.01)

(58) Field of Classification Search
CPC .. G06Q 10/087; G06Q 20/204; G06Q 20/202; G06Q 20/32; G06Q 20/322;
(Continued)

(56) References Cited

U.S. PATENT DOCUMENTS

| 4,387,297 A | 6/1983 | Swartz et al. | 235/472.01 |
| 4,496,831 A | 1/1985 | Swartz et al. | 235/472.01 |

(Continued)

FOREIGN PATENT DOCUMENTS

JP 9081662 3/1997 ............. G06K 7/015

OTHER PUBLICATIONS

Girault, U.S. Appl. No. 61/709,298, filed Oct. 3. 2012.*
(Continued)

*Primary Examiner* — Asfand M Sheikh
(74) *Attorney, Agent, or Firm* — Ernest D. Buff & Associates, LLC; Ernest D. Buff; Margaret A. LaCroix

(57) ABSTRACT

A mobile tablet gun system interchangeably attaches and electronically couples a mobile tablet device to a base form factor through a base mount universal receiver with rotational coupling and electrical communication, allowing conversion of the mobile tablet device from a portrait mode to a landscape mode without operational delay. The base form factor has a bar code scanner and bar code scanner interface PCB activated by a trigger, in communication with the mobile tablet device. The mobile tablet device includes mobile application software and a Primary Printed Circuit Board (PCB) for processing commands for running real-time custom retail applications, system applications and firmware executable on an operating system. A USB pay-
(Continued)

ment card reader supports MSR and EMV payment card readers. POS transactions and real-time daily store-level inventory management functions are carried out, including physical inventory, cycle counting, inventory receiving, store transfers, returns, and re-ticketing.

29 Claims, 19 Drawing Sheets

Related U.S. Application Data

(60) Provisional application No. 61/751,904, filed on Jan. 13, 2013.

(51) Int. Cl.
*G06Q 20/20* (2012.01)
*G07F 7/08* (2006.01)
*G06K 7/10* (2006.01)

(58) Field of Classification Search
CPC ............ G06Q 20/203; G06Q 20/327; G06K 7/10821; G06K 7/1098; G07G 1/0081
See application file for complete search history.

(56) References Cited

U.S. PATENT DOCUMENTS

| | | | |
|---|---|---|---|
| 4,835,374 A | 5/1989 | Swartz et al. ............ 235/472.01 |
| 4,970,379 A | 11/1990 | Danstrom ..................... 250/205 |
| 5,070,293 A | 12/1991 | Ishii et al. ..................... 320/108 |
| 5,324,922 A | 6/1994 | Roberts .......................... 235/375 |
| 5,349,497 A | 9/1994 | Hanson et al. .................. 16/422 |
| 6,109,528 A | 8/2000 | Kurnert et al. ................ 235/462 |
| 6,726,070 B2 | 4/2004 | Lautner .......................... 224/221 |
| 6,853,293 B2 | 2/2005 | Swartz et al. ................. 340/5.92 |
| 7,010,501 B1 | 3/2006 | Roslak et al. .................... 705/23 |
| 7,913,912 B2 | 3/2011 | Do et al. ..................... 235/472.01 |
| 7,971,782 B1 | 7/2011 | Shams ........................... 235/379 |
| 8,235,289 B2 | 8/2012 | Hsu et al. ...................... 235/383 |
| 8,235,294 B2 | 8/2012 | Miller et al. ............. 235/472.02 |
| 8,250,187 B2 | 8/2012 | Cacheria, III et al. ....... 709/221 |
| 8,255,499 B2 | 8/2012 | Cacheria, III et al. ....... 709/221 |
| 8,255,500 B2 | 8/2012 | Cacheria, III et al. ....... 709/221 |
| 9,202,095 B2 * | 12/2015 | Martin ............... G06K 7/10881 |
| 2002/0123957 A1 | 9/2002 | Notarius et al. ................ 705/37 |
| 2003/0216969 A1 | 11/2003 | Bauer et al. ..................... 705/22 |
| 2007/0228163 A1 * | 10/2007 | Schon .................. G06Q 10/087 235/383 |
| 2008/0148523 A1 * | 6/2008 | MacGregor ........ G06K 7/10881 16/430 |
| 2010/0070376 A1 | 3/2010 | Proud et al. ..................... 705/21 |
| 2011/0056723 A1 * | 3/2011 | Slippy ................ H01R 13/5845 174/73.1 |
| 2011/0133780 A1 * | 6/2011 | Shau .............. H03K 19/018585 326/87 |
| 2011/0231272 A1 | 9/2011 | Englund et al. ................ 705/21 |
| 2011/0290876 A1 | 12/2011 | Graves et al. ................. 235/385 |
| 2012/0066079 A1 | 3/2012 | Falzone et al. .................. 705/16 |
| 2012/0072350 A1 | 3/2012 | Goldthwaite et al. .......... 705/44 |
| 2012/0118770 A1 | 5/2012 | Valls ............................ 206/320 |
| 2012/0209749 A1 | 8/2012 | Hammad et al. ............ 705/27.1 |
| 2012/0284131 A1 | 11/2012 | Soffer et al. .................... 705/17 |
| 2012/0296741 A1 | 11/2012 | Dykes ........................ 705/14.53 |
| 2012/0298740 A1 | 11/2012 | Hsu et al. ...................... 235/375 |
| 2013/0030933 A1 | 1/2013 | Talach et al. .................... 705/17 |
| 2013/0098987 A1 * | 4/2013 | Jimenez Lamo ..... G07F 7/0886 235/375 |
| 2014/0018128 A1 * | 1/2014 | Martin ............... G06K 7/10009 455/556.1 |
| 2014/0279119 A1 * | 9/2014 | Knoll ..................... G06Q 20/20 705/23 |
| 2015/0009672 A1 | 1/2015 | Girault .......................... 362/253 |
| 2018/0068300 A1 * | 3/2018 | Saeed .................. G07F 7/0886 |

OTHER PUBLICATIONS

Kaur, Satwant. "The revolution of tablet computers and apps: A look at emerging trends." IEEE Consumer Electronics Magazine 2.1 (2013): 36-41.*

"PAYware Mobile Enterprise" found at http://www.verifone.com/products/hardware/mobile/payware-mobile-enterprise.

"Infinite Peripherals IPC_Infinea_Tab_Spec.pdf" found at http://www.ipclineapro.com/infinea-tab-ipad/.

* cited by examiner

MOBILE TABLET GUN SYSTEM WITH MOBILE TABLET HAVING A MOBILE POS AND ENTERPRISE RESOURCE PLANNING APPLICATION FOR POS CUSTOMER ORDER FULFILLMENT AND IN-STORE INVENTORY MANAGEMENT FOR RETAIL ESTABLISHMENT

CROSS-REFERENCE TO RELATED APPLICATIONS

The present application is a continuation in part of U.S. patent application Ser. No. 13/783,058, filed Mar. 1, 2013, which, in turn, is a non-provisional of U.S. provisional patent application Ser. No. 61/751,904, filed Jan. 13, 2013, the disclosures of which are hereby incorporated in their entirety by reference thereto.

FIELD OF THE INVENTION

The system and method of the present invention relates to mobile barcode scanner guns for sales transactions; and, more particularly, to software systems implemented by barcode readers, inventory and point of sale devices for use in retail establishments.

DESCRIPTION OF THE PRIOR ART

Current retail systems utilize various types of barcode readers, tablets, register stations and Point-of-Sale (POS) devices. For example, one particularly common type of barcode reading device is that used at the checkout register or register station of a store, displaying the price of an item to the checkout clerk, who can then process the sale. Other frequently utilized barcode reading devices can be found at various kiosks in a store wherein a customer can scan an item for a price-check, however these kiosk barcode reading devices do not process the sale, and only provide the ability to view the price of the item scanned. Generally, the checkout counter register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these barcode scanning devices and software implemented therein, fail to provide a combination of mobile technology with fixed based countertop POS technology, and further fail to provide the ability to manage inventory throughout the retailer's franchise.

Typically, the consumer must travel to the location of the good (or order the good online through their personal device and wait for delivery or in-store pick-up). This adds an inconvenient step in that the customer must visit a competitor's store or visit Amazon online and have the goods shipped to their home. Currently, systems and methods fail to allow a sales associate to simply handle the purchase via a mobile system in order to find the item in the store, another store, the warehouse or special vendor order and deliver the goods conveniently to the customer. Not only is this aggravating and inconvenient to the customer, it may also be the deciding factor that discourages a customer from shopping at the brick and mortar store that failed to satisfy their needs during past visits, and it is understood in the retail industry that eCommerce sales continue to rise and foot traffic in brick and mortar stores continues to fall year after year.

Macro trends show an ever-increasing online sale and decreasing brick and mortar sales. However, none of the conventional systems and methods provide the ability for a retailer to utilize software and hardware that runs the entire store, ranging from real-time inventory management, to POS sales transactions while moving between a fixed POS workstation, to a mobile POS device, changing network topology and POS peripheral devices without user intervention or disruption of current transaction processing being performed by the user, all on one multi-functional mobile tablet device.

Despite heretofore disclosed and utilized systems and methods, managing inventory throughout retailer establishments, nationally and internationally, has proven unreliable and difficult. POS capabilities remain separate from inventory management throughout retailer establishments, and as a result, both retailers and customers are tied to the physical location of the checkout work station, resulting in frustration and loss of sales. Disclosed and utilized systems and methods do not provide the ability to carry out real-time daily corporate and store level inventory management functions, such as physical inventory, cycle counting, inventory receiving, store to store transfers, return to vendor, product re-ticketing, and cannot operatively identify a product by its barcode, locating inventory chainwide.

Based on the foregoing, there exists a need for a Ethernet/Wi-Fi/wireless cellular "mobile tablet gun system" with a "mobile tablet device" utilizing a system and method that communicates daily inventory management such as physical inventory, cycle counting, inventory receiving, store to store transfers, return to vendor, and product re-ticketing, while at the same e providing the ability to process customer sales transactions through a mobile POS application. Further, there is a need in the art for a system and method that is appointed to be utilized with several USB devices such as a mobile portable barcode scanner/2D barcode reader (scanner) and magnetic stripe reader (MSR) devices that can be instantly integrated into a fixed. POS countertop terminal, removed from that terminal by retail employees in a retail location, thus becoming a fully functioning mobile POS sales transaction device or providing real-time daily store-level inventory management applications for a full combination of tasks, including physical inventory, cycle counting, inventory receiving, store to store transfers, return vendor, product re-ticketing, as well as mobile POS applications without disruption or delay of operation. Additionally, there is a need in the art for a system and method that can scan the merchandise barcode of customer interest, provide complete details of the product along with its selling price and taxes, as well as any physical and electronic coupons, promotions, and customer loyalty data. and rewards available. Through use of such a novel system, a customer may decide to purchase the merchandise just scanned or look at additional items, and when a purchase decision is made by the customer, an employee can readily process the purchase, providing a courteous friendly sales environment wherein every employee has complete access to all the relevant information on any product of interest and their customer's loyalty data and available rewards.

There remains a need for a mobile tablet gun system that provides the ability to carry out real-time daily corporate and store level inventory management functions for such tasks as physical inventory, cycle counting, inventory receiving, store to store transfers, return to vendor, product re-ticketing, and operatively identifies a product by its barcode, locating inventory chainwide. In addition, there remains a need in the art wherein the system can also stablish price, taxes, promotions, physical and electronic coupons and customer loyalty data and rewards available, and processes the sale of merchandise to a customer. Further needed in the art is a system that is "portable" across the entire store operation without delay or work loss by implementing a motherboard PCB, custom Firmware and system applications specialized and. integrated within the system uniquely for the retail technology environment.

SUMMARY OF THE INVENTION

The present invention provides an Ethernet, Wi-Fi and wireless cellular network capable mobile tablet gun system, with an embedded mobile tablet device, running a real-time corporate and store level inventory management suite of applications, StoreMobile INV™, a trademark of Retail Technologies Corporation, connected directly to the corporate Enterprise Resource Planning (ERP) system or (ERP Cloud) and running a mobile POS application, StoreMobile POS™, a trademark of Retail Technologies Corporation, connected directly to the POS Store or Cloud Server, for customer purchases throughout the retail store and instantly portable and mobile away from the checkout counter and well beyond the store walls without systemic or operational disruption. Uniquely, the mobile tablet gun system provides the ability to carry out real-time daily corporate and store level inventory management functions for such tasks as physical inventory, cycle counting, inventory receiving, store to store transfers, return to vendor, product re-ticketing, and operatively identifies a product by its barcode, locating inventory chainwide. In addition, the system establishes price, taxes, promotions, physical and electronic coupons and customer loyalty data and rewards available and processes sale of merchandise to a customer.

These functions are carried out by the system regardless of the location of the inventory in ways not available in today's fixed or mobile POS and inventory scan gun/terminals or tablet technology, as the store personnel can "hot-key" back and forth between these typical ongoing operational inventory functions and tasks and POS customer sales transactions without disruption or loss of work in progress in either operational area of the retail business. Further enhancing the store personnel's productivity capabilities, the mobile tablet gun system is instantly portable and mobile at every systemic level. Surprisingly, the system can quickly "disconnect from" or "reconnect to" a fixed Ethernet-based. POS workstation (trade name: POSi-Dock™), wired directly to fixed POS peripheral devices such as a payment terminal, POS printer and cash drawer, to a Wi-Fi network based mobile tablet gun system operating in and around the store floor and using its own USB barcode scanner, MSR/EMV reader and a Bluetooth or Wi-Fi POS printer until such time that Wi-Fi is no longer available, at which time the mobile tablet gun system instantly and immediately connects to an industry standard cellular carrier without transactional delay or operational disruption and operates just as it did while docked within the POS docking station (trade name: POSiDock™). In effect, the store personnel are completely "portable" across the entire store operation without delay or work loss by unique and inventive motherboard or "Primary PCB", along with Custom Firmware (FIRMWARE), Custom System Applications (System Apps) and industry Standard and Custom Retail Applications (Retail Apps) designed, specialized and integrated uniquely for the retail technology environment.

More specifically, the Ethernet, Wi-Fi, and wireless cellular network capable mobile tablet gun system is adapted to receive a mobile tablet device. The mobile tablet gun system has a mobile tablet device, preferably 4" to 7" diagonally and more preferably with a 6" to 7" (approx.) diagonal LCD display, which can be attached to a variety of base form factors, through a base mount universal receiver having a removable, rotational coupling and a breakaway feature for durability purposes in the event the device is dropped or sustains a significant impact. The mobile tablet device has a custom "hot swappable" primary lithium-ion battery and a custom lithium-ion backup battery integrated within the mobile tablet device, a USB payment card reader supporting both a magnetic stripe reader (MSR) and a Europay MasterCard Visa (EMV) payment card reader mounted on one edge of the mobile tablet device. A USB barcode scanner input device incorporated within the "pistol grip base housing" is operable by pressing a trigger, also incorporated within the pistol grip base housing.

In one aspect of the invention, a mobile tablet gun system for interchangeably attaching and electronically coupling a mobile tablet device to a base form factor is provided. The base form factor has a base mount universal receiver integrated with a rotational coupling unit connected to an interface printed circuit board (PCB) located on the base form factor for interchangeably mounting and electronically communicating with the mobile tablet device. The printed circuit board (PCB) is located on the base form factor for interchangeably mounting and electronically communicating with the mobile tablet device and providing rotatable connection between the mobile tablet device and the base form factor, wherein the base mount universal receiver with rotational coupling is located between the mobile tablet device and the base form factor. The base form factor has a bar code scanner and bar code scanner interface PCB in communication therewith. The base form factor includes a trigger adapted to activate the bar code scanner. The mobile tablet device has a top housing with a display and a bottom housing, mobile application software and a Primary Printed Circuit Board (PCB) for processing commands for running real-time custom retail applications, system applications and firmware executable on an operating system adapted to be connected to the base form factor through the base mount universal receiver. The mobile tablet device has one or more docking station PCB interface connectors located on the bottom housing of the mobile tablet device for mounting and electronically connecting the mobile tablet device to the base form factor through the base mount universal receiver with the rotational coupling unit. The mobile tablet device has a battery assembly having one or more batteries. The mobile tablet device includes a USB payment card reader supporting a Magnetic Strip Reader (MSR) and a Europay MasterCard Visa (EMV) payment card reader. The mobile tablet device is adapted to execute point of sale (POS) transactions and real-time daily chain store-level inventory management functions for such tasks as physical inventory, cycle counting, inventory receiving, store to store transfers, return to vendor, and product re-ticketing.

Another aspect of the invention provides a mobile tablet device adapted to be removably attached and electronically coupled through a base mount universal receiver to one or more "base form factors". The mobile tablet device has a bottom housing, top housing with a display, and side walls. A Primary Printed Circuit Board (PCB) is provided for processing commands and running custom retail applications, system applications and firmware executable on an operating system adapted to be connected to the base form factor through the base mount universal receiver. One or more docking station PCB interface connectors are provided, located on the bottom housing of the mobile tablet device adapted to mount the mobile tablet device on the base form factor and electronically connecting to and communicating with the base form factor through an interface PCB of the base form factor. The mobile tablet device also includes a battery assembly having one or more batteries. A USB payment card reader is included, supporting a Magnetic Strip Reader (MSR) and a Europay MasterCard Visa (EMV) payment card reader. The mobile tablet device is adapted to execute POS transactions and real-time daily chain store-level inventory management functions for such tasks as physical inventory, cycle counting, inventory receiving, store to store transfers, return to vendor, and product re-ticketing.

In another aspect of the invention there is provided a mobile tablet gun for processing a retail store point of sale (POS) transactions comprising: a) a handle portion having a top wall with a rotational coupling unit thereon, the coupling unit comprising a rotation stopping plate, rotation stop plate and rotation base plate; b) a base mount universal receiver integrated within the rotational coupling unit, wherein the base mount universal receiver within the rotational coupling unit includes an interface PCB and is adapted to interchangeably mount and electronically communicate with a docking station PCB interface connector of a mobile tablet device having a system integrated therein that enables store level real-time inventory management and a fully functioning POS capability for selling merchandise in a retail sales environment; c) the base mount universal receiver with rotational coupling unit allows conversion of the mobile tablet device from portrait mode to landscape mode without operational delay of the system; d) a bar code scanner and bar code scanner interface PCB in communication therewith; and e) a trigger adapted to activate the barcode scanner.

Yet another aspect of the invention provides a mobile tablet gun system method for interchangeably attaching and electronically coupling a mobile tablet device to a base form factor, comprising the steps of: a) attaching and electronically coupling said mobile tablet device on said base form factor through a base mount universal receiver integrated with a rotational coupling unit connected to an interface printed circuit board (PCB) located on said base form factor, said base mount universal receiver with said rotational coupling unit allowing conversion of said mobile tablet device from a portrait mode to a landscape mode without operational delay; b) electrically initiating a bar code scanner and bar code scanner interface PCB in communication therewith located in said base form factor, and wherein said base, form factor includes a trigger adapted to activate said bar code scanner; c) processing commands on a display of said mobile tablet device, said mobile tablet device having mobile application software and a Primary Printed Circuit Board (PCB) for running real-time custom retail applications, system applications and firmware executable on an operating system; d) mounting said mobile tablet device to said base form factor through one or more docking station PCB interface connectors located on said bottom housing of said mobile tablet device for mounting end electronically connecting said mobile tablet device to said base form factor through said base mount universal receiver integrated with a rotational coupling unit and breakaway features; e) supporting a Magnetic Strip Reader (MSR) and a Europay MasterCard Visa (EMV) payment card reader through a USB payment card reader of said mobile tablet device; whereby said mobile tablet device is adapted to execute POS transactions and real-time daily chain store-level inventory management functions for such tasks as physical inventory, cycle counting, inventory receiving, store to store transfers, return to vendor, product re-ticketing.

Additionally, another aspect of the invention provides for one or more non-transitory computer readable media having instructions operable to enable a mobile tablet device to be mounted on a base form factor in order to execute POS transactions and real-time daily chain store-level inventory management functions, comprising: a) attaching and electronically coupling said mobile tablet device on said base form factor through a base mount universal receiver integrated with a rotational coupling unit connected to an interface printed circuit board (PCB) located on said base form factor, said base mount universal receiver with said rotational coupling unit allowing conversion of said mobile tablet device from a portrait mode to a landscape mode without operational delay; b) electrically initiating a bar code scanner and bar code scanner interface PCB in communication therewith located in said base form factor, and wherein said base form factor includes a trigger adapted to activate said bar code scanner; c) processing commands on a display of said mobile tablet device, said mobile tablet device having mobile application software and a Primary Printed Circuit Board (PCB) for running real-time custom retail applications, system applications and firmware executable on an operating system; d) mounting said mobile tablet device said base form factor through one or more docking station PCB interface connectors located on said bottom housing of said mobile tablet device for mounting and electronically connecting said mobile tablet device to said base form factor through said base mount universal receiver integrated with a rotational coupling unit and breakaway features; and e) supporting a Magnetic Strip Reader (MSR) and a Europay MasterCard Visa (EMV) payment card reader through a USB payment card reader of said mobile tablet device. A "Near Field Communications" (NFC) module for "tap and go" POS payment processing is contemplated in future versions of the invention as the technology is more broadly accepted in the mobile retail technology industry.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1b is a top view of the embodiment of FIG. 1a;

FIG. 1c is a front top-side view of the embodiment of FIG. 1a;

FIG. 1d is a back top-side view of the embodiment of FIG. 1a;

FIG. 1e is a cross-sectional view taken at A from FIG. 1a;

FIG. 1g is a front view of the embodiment of FIG. 1a;

FIG. 1h is a bottom view of the embodiment of FIG. 1a;

FIG. 2c is a side view of the assembly of the pistol grip base housing of FIG. 2a;

FIG. 2d is a front view of the assembly of the pistol grip base housing of FIG. 2a;

FIG. 2e is a top side view of an embodiment of the pistol grip base housing of FIG. 2a;

FIG. 2f is a top view of an embodiment of the pistol grip base housing of FIG. 2a;

FIG. 2g is another top side view of an embodiment of the pistol grip base housing of FIG. 2a;

FIG. 2h is another top side view of an embodiment of the pistol grip base housing of FIG. 2a;

FIG. 3b is a back view of the embodiment of FIG. 3a;

FIG. 3c is a first side view of the embodiment of FIG. 3a;

FIG. 3d is a second side view of the embodiment of FIG. 3a;

FIG. 3e is another back view of the embodiment of FIG. 3a;

FIG. 3f is another back view of the embodiment of FIG. 3a;

FIG. 3g is a bottom side view of the embodiment of FIG. 3a;

FIG. 7b is a top-side of the embodiment of FIG. 7a; and

DETAILED DESCRIPTION OF THE INVENTION

Figure 1A:
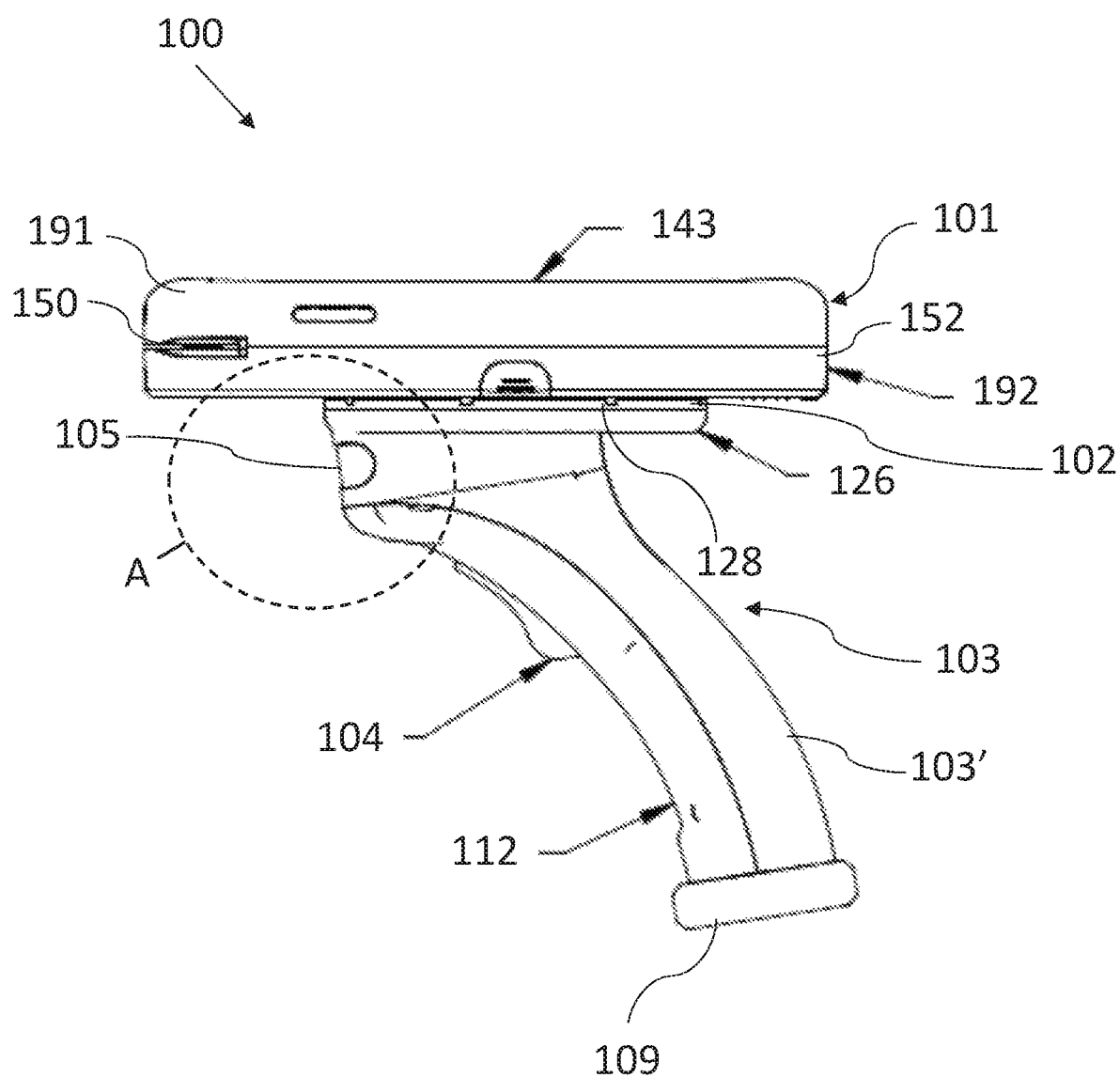
FIG. 1a is a side view of an embodiment of the mobile tablet gun system showing a mobile tablet docked through a base mount universal receiver to a pistol grip base housing operating in concert under the enterprise resource planning mobile application's environment.

This invention relates to real-time store-level inventory management (Back Office), a fully functioning point of sale (POS) system for customer check-out of merchandise in a retail sales environment along with corporate level ERP Cloud inventory and customer specific data/fulfillment applications (ERP Cloud). The system comprises a mobile tablet device (upper receiver) preferably having an approximately 6" diagonal LCD display, which can be attached to a variety of base form factors, through a base mount universal receiver having a removable, rotational coupling and a breakaway feature for durability purposes in the event the device is dropped or sustains a significant impact.

The mobile tablet gun system has a custom "hot swappable" primary lithium-ion battery and a custom lithium-ion backup battery integrated within the mobile tablet device, a USB payment card reader supporting both a magnetic stripe reader (MSR) and a Europay MasterCard Visa (EMV) payment card reader mounted on one edge of the mobile tablet device. A Near Field Communications (NFC) module for processing payment cards is proposed for future use as the chain retail industry acceptance becomes more prevalent. A USB barcode scanner input device incorporated within the "pistol grip base housing" in one base form factor, is operable by pressing a trigger, also incorporated within the "pistol grip base housing". The mobile tablet gun system through its specialized and uniquely developed hardware platform and its multiple interchangeable base form factors, operates both standard and custom Retail Apps allowing store personnel to quickly and easily migrate between POS customer sales transactions, store Back Office applications, ERP Cloud-based inventory and Customer Fulfillment applications without work loss or delay as the store personnel can "hot key" between this advanced consortium of Retail Apps.

Ease of use and increased customer service levels are further enhanced as the mobile tablet gun system can instantly and seamlessly migrate between network architectures including Ethernet, and Cellular, as well as technically connecting and disconnecting between Ethernet, Serial, USB, Wi-Fi and Bluetooth POS peripheral devices controlled by Custom Configuration settings, as warranted and desired by the retail enterprise. Resulting in an unprecedented level of both store systems hardware interoperability and ERP Cloud, Back Office, and POS software integration. Collectively, this unique combination of custom developed Hardware, Firmware, Systems Software, and Retail Apps, significantly enhance customer service levels while also reducing the overall technology "footprint" and cost associated with managing a chain of retail stores.

The system and method of the present invention provide technology that empowers sales associates to service their customers from a variety of form factors such as a fixed POS terminal, a Wi-Fi hand held terminal and a cellular handheld terminal. With the unique feature of being able to migrate between those form factors without disruption to work flow or even a POS sales transaction. It can instantly connect and disconnect to specific POS peripheral hardware, whether Ethernet-based, Serial based, or USB based on the needs of the clerk/user as they attempt to satisfy their customer's needs by locating inventory desired by the customer without consideration to the physical location of the merchandise or leaving the customer to do so. Through the use of the subject system and methods, inventory can be found, and goods can be purchased anywhere, anytime and delivered wherever and whenever the consumer wants in a far more efficient and cost-effective manner than current industry standard retail systems can offer.

Under current systems and methods, typically, the consumer must travel to the location of the good (or order the good online through their personal device and wait for delivery or in-store pick-up). This adds an inconvenient step that is, rather than allowing the sales associate to simply handle the purchase via the mobile tablet gun system, finding the item in store, another store, the warehouse or special vendor order and delivering the goods conveniently to the customer, the customer must visit a competitors store or visit Amazon online and have the goods shipped to their home. Not only is this aggravating and inconvenient to the customer, it may also be the deciding factor that discourages a customer from shopping at the brick and mortar store that failed to satisfy their needs in past visits and it is understood in the retail industry that eCommerce sales continue to rise and foot traffic in brick and mortar stores continues to fall year after year.

Taking a deeper look into the macro trend of ever increasing online sales and decreasing brick and mortar sales, it is clear that none of the heretofore systems and methods provide the ability for a retailer to utilize software and hardware that runs the entire store, ranging from real-time inventory management, to POS sales transactions while moving between a fixed POS workstation to a mobile POS device, changing network topology and POS peripheral devices without user intervention or disruption of current transaction processing being performed by the user, all on one multi-functional mobile tablet device. The system, method, and devices herein provide this unique advantageous feature. The subject system and method, and devices implementing the same, provide the following advantages: 1) increased store employee productivity, 2) reduced technology cost and footprint, and) improved customer satisfaction, all of which, in turn, lead to an ensured return on investment (ROI) for the retail store operator.

Enterprise Resource Planning (ERP) Cloud integrates internal and external management information throughout an organization, embracing finance/accounting, manufacturing, sales and service, customer relationship management, etc. The ERP Cloud automates this activity with an integrated software application. The purpose of the ERP Cloud is to facilitate the flaw of information between all business functions inside the boundaries of the organization and manage the connections to outside stakeholders. The ERP Cloud can run on a variety of computer hardware and network configurations, typically employing multiple databases as a repository for information. Examples of vendors who build industry-leading ERP Cloud systems include: JDA Software Group, Oracle, SAP, Microsoft, Epicor, etc. However, present systems do not provide the ability for a store employee at a physical store location to have direct mobile access to real-time inventory management and POS capability concurrently on one device.

The subject system and methods provide a fully functioning point of sale (POS) system for customer check-out of merchandise in a retail sales environment along with the ERP Cloud inventory and customer specific data/fulfillment applications all running concurrently and instantly accessible by the store employee. Real-time mobile functionality is provided by the subject system and methods, preferably built around the MA ERP Cloud (MMS) environment, leveraging current legacy store systems and accessing the current MMS iSeries environment. Through use of the subject system MMS iSeries environment, businesses can build their own cloud to provide mobile customer check-out/order fulfillment and real-time inventory management in the store through the mobile tablet gun system.

Uniquely, the subject system and method provides the ability to use a mobile tablet gun system in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction through increased face to face interaction, and a higher fill rate for customer desired inventory, which, in turn, ensures the mobile tablet gun system will provide significant ROI to the retail store operator.

Advantageously, the subject system, method, and devices of the present invention allow a sales associate using a mobile tablet gun system to migrate from being part of a fixed POS workstation to becoming a completely mobile POS device anywhere in the store and physically beyond the store without work-flow disruption either in ERP Cloud transactions, Back Office transactions or POS transactions migrating between them all without delay or loss of uncompleted tasks within each Retail App including inventory management tasks such as: a) Daily Cycle Counting & Physical Inventory, b) Receiving & Returns, c) Store Transfers, d) Item Checking, e) Re-Ticketing, etc. Such tasks are performed real-time within the ERP Cloud and are all visible chain-wide. Through use of the subject system and method, a sales associate can perform the following from a mobile tablet gun system: i) sell "out of stock" merchandise available in the warehouse, another store or from a vendor; ii) create a purchase order (PO) or transfer within MMS and track that item transfer on the web; iii) sell merchandise from their e-commerce site; iv) combat "Showrooming" by providing customers real-time competitive merchandise and pricing information, allowing staff to match prices and satisfy their customer's demands by exceeding expectations within a brick and mortar store and even beyond its walls.

The mobile tablet gun system represents the forefront of retail stores. For decades retail stores have been designed around cash-wrap POS terminals. New studies indicate that cash-wrap POS terminals are becoming less relevant in future retail markets. Approximately one fifth (21.4%) of retailers are planning on removing or decreasing the use of traditional fixed-station POS/register stations per store. In many retail verticals, mobile POS will eventually replace these systems. As mobile devices mature and harden, the need for fully fixed POS register stations and inventory scan guns/terminals running limited custom operating systems and inventory applications is both in decline and cost ineffective as they are very expensive and locked into outdated technology. Based on current trends, legacy POS terminals and inventory scan guns/terminals are on their way to becoming obsolete. Although mobile consumer devices appear to have some potential to fill this gap, these devices typically lack durability, hardware integration, ERP Cloud integration and comprehensive POS to Back Office integrated functionality running on one cost-effective mobile tablet device.

There are many advantageous technical features of the mobile tablet gun system and integrated mobile tablet device of the invention which ensure that the final product is both richly functional and cost-effective. One key attribute is that the mobile tablet device can run on more than one operating system, such as those associated with the trade name Android (Google) and Windows (Microsoft). Preferably the mobile tablet device runs on Microsoft Windows 10 operating system as it is by far the most prevalent retail store systems hardware operating system. Though Windows 10 is operationally desirable as a store systems OS platform, it was designed for industry standard desktop, laptop, and large tablet-based computer devices and not for small mobile devices with sub 7" diagonal LCD displays. The technical challenges that prevent Windows 10 OS on a sub 6 inch MIPI based touchscreen LCD display were difficult to overcome for a number of technical reasons, including: (1) Windows 10 was not designed for sub 7" diagonal touchscreen LCD displays; (2) Mobile cell phone computer processors are not robust enough to effectively run Windows 10 OS; (3) Computer processors capable of running Windows 10 require much more battery amp capacity than mobile phone devices can supply; (4) Computer processors capable of running Windows 10 generate significantly more heat than their mobile phone processor counterparts, inherently causing overheating within a small mobile tablet device case; and (5) Computer processors capable of supporting Windows 10 do not typically support the MIPI video signal interface found throughout the mobile phone industry's touchscreen LCD displays. The cost to overcome these technical issues was extensive in both time and money.

To overcome all these challenges in building the mobile tablet gun system powered by an Intel Atom processor running Windows 10 OS and interfaced to a MIPI touchscreen LCD display, a number of engineering challenges had to be overcome within the mobile tablet device including a Custom Primary PCB, Firmware, Systems Apps, Retail Apps and a Heat Sink, all of which had to be designed, built and programmed in order to leverage Windows 10 as the preferred operating system running on the mobile tablet device with a 6" to 7" (approx.) diagonal LCD touchscreen MIPI display. Further, Windows 10 was a newly released OS at the start of the design; consequently, the engineering team had to deal with Windows updates regularly throughout the project.

In order to maintain focus in building the mobile tablet device, a Product Requirements Document (PRD) was written to ensure it met all the requirements necessary for the mobile tablet gun system to succeed in the retail technology industry. Unfortunately, many of the requirements of the PRD posed serious technical challenges that were unforeseen. The worst of these challenges being designing an energy efficient mobile tablet device that would provide four to six hours of total battery life while maintaining a thermal dynamic design that would disperse heat effectively, as it was desired to limit the LCD display temperature at or b 1.15 F., maintain battery temperature at or below 145 F. to avoid charging disruption/shutdown and limit the processor from overheating causing automatic throttling or shutdown of the processor. These, and many more technical challenges such as managing the accelerometer for portrait and landscape viewing by application, monitoring main processor and battery temperatures, power management, multi-layered sleep mode and managing the recharging of multiple batteries by priority of need, were overcome by the subject system and method.

In the retail industry, it is understood that consumer-based computer devices are not designed for industrial use and typically will not hold up over the test of time in a retail store environment. Advantageously, the mobile tablet gun system is built with an industrial hardened frame which can be attached to a variety of base form factors, through a base mount universal receiver having a removable, rotational coupling and a breakaway feature for durability purposes in the event the mobile tablet gun system is dropped or sustains a significant impact.

The mobile tablet gun system was designed with an "easy to use" mobile tablet gun (trade name: Tablet Gun™), which can be inserted into a fixed POS terminal (trade name: POSiDock™), a wearable model (trade name: Spider Gun™) and a handheld model with the subject system and method integrated therein. The functional specification of the mobile tablet device is a small mobile tablet device that preferably measures about 4 to 7 inches diagonally, and most preferably approximately 6 to 7 inches diagonally. The handle for one of the base form factors of the mobile tablet gun system is based on a "pistol grip" design with a barcode scanner trigger similar to a pistol and can be coated with rubber or molded with an "abrasive" texture for both comfort and limiting slippage within the hand. Rotation from landscape mode to portrait mode of the mobile tablet gun system is achieved with compression tubes, as compression springs roll in and out via a dial and rotate smoothly but stay in place when it gets there. The mobile tablet gun system has a single action release button on one side of the mobile tablet device which, when depressed, allows the mobile tablet device to be easily pulled apart from the pistol grip base housing.

Further, if the mobile tablet device is connected to the pistol grip base housing, a "breakaway" feature is incorporated into the design to protect the mobile tablet device and the lower pistol grip base housing against high force impacts such as accidental drops or the mobile tablet gun system being stepped on. This "breakaway" mechanism has tension springs, similar in nature to a "snow-ski boot binder", which will not allow separation between the upper housing and pistol grip base housing in normal operation and will only "release" if the mobile tablet gun system sustains an impact of twenty-five to thirty foot-pounds of force received upon the "breakaway" release mechanism. If such an incident occurs, the mobile tablet device will separate from the pistol grip base housing, which absorbs much of the impact force when the mobile tablet gun system is dropped, stepped on or significantly impacted in some way. Technically, the mobile tablet device had to be built from the ground up in order to systemically provide all the strategic technological advantages for the mobile tablet gun system. The first decision made in building the mobile tablet device was to use the Intel Atom dual-core processor due to its capability to run both Windows and Android-based operating systems with Windows being preferred in the chain retail store systems market. Next, a custom "motherboard" or "Primary PCB" had to be designed and built for the mobile tablet device in order to meet the specifications within the Product Requirements Document (PRD) of the mobile tablet gun system. This Primary PCB has over 450 unique and separate components on it and had to be designed using a very complex multi-layered board.

Additionally, the mobile tablet device has a primary lithium ion battery that can last up to five hours of normal operation and can be swapped out while the mobile tablet device is in operation as there is a secondary lithium-ion battery integrated within the mobile tablet device that can provide up to forty minutes of full operational backup until such time a charged primary battery is docked into the mobile tablet device battery tray. The mobile tablet device also has a multi-colored LED battery status light, which is mounted above the power button directly next to the LCD display, providing the user with both a battery "gas gauge" (LED White: 25% or higher battery life/LED Amber: 10% to 24% battery life/LED Red: 9% or less battery life) and when the mobile tablet device is docked in the POSiDock™, the LED displays either "Green" (battery fully charged) or "Red" (battery charging). The LED light has one other status condition which monitors "sleep mode" of the mobile tablet device. When the LED is "breathing on and off", it indicates the mobile tablet device is still powered on, but the screen is turned off. In this situation, one tap of the LCD display screen turns it back on in about 2 to 3 seconds. At this point, the LED light will stop breathing and remain steadily on. With regard to charging the backup battery, the primary battery will charge the backup battery until the backup battery is completely full and power the mobile tablet device simultaneously as long as the primary battery has a charge above 25%. This battery charging feature helps ensure the backup battery can provide adequate backup to the primary battery ongoing.

Generally stated, the present invention comprises a system and method for use with a mobile tablet gun system associated with an integration capable mobile tablet device. This system, method, mobile tablet gun system and integration capable mobile tablet device is used by an employee anywhere within or beyond the walls of their store for both daily inventory management purposes for such tasks as physical inventory, cycle counting, inventory receiving, store to store transfers, return to warehouse/vendor, product ticketing without limiting the store employee in servicing a customer that might approach the employee to purchase goods, assisting customers by "line busting" excessive checkout lines during a lunchtime "rush", selling goods via a sidewalk sale or kiosk out in front of the store or maybe checking customers outside in the garden center to avoid moving large merchandise around.

Now consider a situation in a small specialty store with one employee working the store and that store clerk is in the middle of receiving goods from the warehouse when a customer walks up to purchase their favorite NFL team jersey. The store clerk "hot keys" out of the ERP cloud application (trade name: StoreMobile INV™ ERP Cloud application) and into the mobile POS application (trade name: StoreMobile POS™ application) and scans, for example, a customer's NFL team jersey when the customer suddenly says, "I forgot to buy my husband one as well." The store clerk tells the customer no problem and removes the subject table gun system (trade name: Tablet Gun™) from the docking station (trade name: POSiDock™) and the system (trade name: Tablet Gun™) immediately disconnects the fixed POS receipt printer and connects to the Bluetooth POS receipt printer attached to the store clerk's waistband. The store clerk escorts the customer back to retrieve a team jersey for her husband only to find out they did not have his size. The store clerk tells the customer he can look up the item throughout the chain and select it right in the middle of the current POS transaction and include the item in the sale. The store clerk finds the item in the warehouse and asks if she wants it shipped to her house or return to the store for pickup. The customer elects to have the item shipped to her house; therefore, the store clerk enters in the shipping/tracking information, which is provided on the receipt for customer reference and takes the customer's chip payment card and dips it into the table gun system (trade name: Tablet Gun™) EMV reader and completes the sale. The customer leaves the store and the store clerk "hot keys" from the POS application back to the ERP Cloud application (trade name: StoreMobile INV™ ERP Cloud inventory application) and continues receiving goods into the store without previous loss of work within the ERP Cloud application.

Given today's chain retailers are fighting an uphill battle against eCommerce giants like Amazon, retailers are forced to find creative ways to reduce cost any way they can and they have to compete in ways they never have before. Telling a customer an item is unavailable for sale is a recipe for converting a store shopper to an eCommerce shopper and the annual sales trend of retail eCommerce continues to grow to staggering numbers. Brick and mortar retailers must find a way to satisfy customers each and every time they visit their store and the mobile tablet gun system uniquely combines hardware, firmware, systems software and applications software designed specifically to ERP Cloud applications, Store Inventory applications and Point of Sale applications working collectively on one technological platform to run the front of the store, the back of the store and the eCommerce side of the store.

Systemically, the mobile tablet gun system for processing ERP Cloud and store level inventory inquiries and transactions, as well as retail POS sales and customer related transactions comprises System Apps and Firmware installed or integrated within the mobile tablet gun system's Primary PCB. The System Apps and Firmware control a wide variety of specialized functions and actions within the mobile tablet device, including: Control of the accelerometer for screen orientation by Retail App, processor and battery temperature monitoring, LED color-coded battery power level displays for the primary battery pack, unique recharging schemas for both the primary and backup battery, processor "sleep mode" power management, a Low Voltage Differential Signaling (LVDS) based computer processor chip set "integrated" to utilize a Mobile Industry Processor Interface (MIPI) touchscreen LCD display through Firmware and Primary PCB hardware modifications, Advanced Configuration and Power Interface (ACPI) BIOS integration from the computer processor to the OS, a USB based barcode scanner for reading one and two dimensional barcodes, a USB based MSR/EMV payment card reader, LED lighting for the EMV payment card reader designed to direct user operations during chip-based payment card processing. A Near Field Communications (NFC) module for processing payment cards is proposed for future use as the chain retail industry acceptance becomes more prevalent.

Various operating systems, such as those associated with the trade name Android (Google) and Windows (Microsoft) are contemplated; however, in a preferred embodiment, the mobile tablet device uses the Windows 10 operating system (OS), which was designed for industry standard tablets, laptops and desktops using an LVDS video signal interface between the computer's processor and its LCD display. Given the mobile tablet device has a MIPI based video signal interface found in almost every cell phone around the world, the subject system had to overcome many technical challenges to leverage Microsoft's Windows 10 OS within a small "mobile based" tablet that has a MIPI based LCD touchscreen display measuring approximately 6" to 7" diagonally. The inventive solution to this issue resides within the Firmware, and Primary PCB integrated within the mobile tablet device to bridge the two distinctly different video signal interfaces along with many other technical challenges that will become more evident when reference is had to the following detailed description. Further enhancing the subject system, Retail Apps were modified to eliminate the need to in an experienced Windows 10 user, accustomed to using Windows 10 on a typical industry standard tablet, laptop or desktop. Finally, given the capability of the Firmware and Primary PCB to facilitate the use of Microsoft Windows operating system within the mobile tablet device, the use of industry-standard Windows applications typically running on common tablets, laptops and desktops can be used without further modification. This capability eliminates the need to manage multiple sets of retail applications and OS environments between fixed POS terminals, mobile POS terminals and RF scan guns/terminals by the IT Departments of chain retailers.

Operationally, the mobile tablet gun system for processing ERP Cloud and store level inventory inquires/transactions, as well as retail POS sales and customer related transactions, further preferably comprises and controls the USB barcode scanner input device and the scanner trigger for activating a barcode scan operation of an item of interest to a customer by an employee of a retail establishment or for corporate and/or store inventory inquiries or transactions as well. The barcode scan operation is adapted to cause Retail Apps and Firmware to communicate within the mobile tablet device, which triggers the Retail Apps running on the mobile tablet device to receive a scanned barcode. In operation and function, one type of transaction might be a customer attempting to purchase merchandise from any retail store employee having the mobile tablet gun system while docked within the Ethernet-based POS docking station (trade name: POSiDock™), receiving full product details, price, electronic and physical coupons, promotions and customer loyalty data and rewards directly from the POS Store or Cloud Server and ERP Cloud system when the customer realizes they have the wrong item they desired. Recognizing the item is difficult to identify, the store clerk removes the mobile tablet gun system from the POS docking station (trade name: POSiDock™), instantly disconnecting it from the wired Ethernet connection and re-establishing the network connection via a Wi-Fi access point or connecting to the store network via a cellular network if Wi-Fi is not available; and, without delay or disruption of a sales transaction already in process while docked in the POS docking station (trade name: POSiDock™).

The clerk escorts the customer back to the shopping area (inside or outside) and replaces the wrong item with the correct item if available, completing the transaction out on the sales floor or back at the checkout area and docked back in the POS docking station (trade name: POSiDock™) or beyond the store structure if necessary depending on the store layout. If the item was not found on store premises, the clerk has complete inventory access across all stores, the corporate warehouse and to vendors for "special order items" via the store mobile application (trade name: StoreMobile INV™). The clerk is thereby equipped with all tools required to sell and deliver the item(s) as desired by the customer once the item is located. Systemic and operational portability and complete mobility allow store personnel to fully exhaust all avenues in finding the desired inventory item(s) on the customer's behalf through the mobile tablet gun system without sending the customer on their own to find the item(s) they want.

An advantaged operational feature of the mobile tablet gun system is the Retail Apps having access to both fixed counter-based POS peripheral devices such as payment terminals, POS printers, scanners, cash drawers, weighted scales and customer displays, as well as the use of its own integrated USB POS peripheral devices when docked in e POS docking station (trade name: POSiDock™). This extreme flexibility between fixed and mobile POS peripheral devices is made possible through the mobile tablet device's Software, Firmware, and Primary PCB. Upon removal from the POS docking station (trade name: POSiDock™), the mobile tablet gun system, instantly disconnects from Ethernet and reconnects to the network via Wi-Fi, can continue to use networked based fixed POS peripheral devices such as a networked POS printer and cash drawer if desired or simply use the mobile tablet device integrated USB barcode scanner, MSR/EMV payment card reader and Bluetooth or Wi-Fi POS printer without having access to fixed networked POS peripheral devices depending on operational needs. Either way, the mobile tablet gun system migrates from a fixed POS terminal to a mobile POS terminal without operational delay, data loss or user intervention as determined by Custom Device Configuration Settings controlled by the retail operation.

The mobile tablet gun system is encased in a hardened case/shell design with a removable rotational "breakaway" feature engineered for "portrait" and "landscape" views of the mobile tablet device while protecting the device against damage during drops and/or high impact, especially while attached to the pistol grip base housing form factor. The mobile tablet device includes System Apps and Firmware integrated within its Primary PCB of the subject system and method and is constructed having installed Retail Apps networked to corporate level software that includes the subject ERP Cloud system and POS Store or Cloud Server associated with a user of the mobile tablet gun system and retailer's data and typically run concurrently. The Retail Apps are connected to the POS Store or Cloud Server and ERP Cloud system via a combination of Ethernet, Wi-Fi or wireless cellular connectivity, automatically switching between Ethernet and Wi-Fi network connectivity, but requiring user intervention to make a secured network connection when using a wireless cellular network carrier.

The Retail Apps are operative to establish Ethernet, Wi-Fi or the wireless cellular network connection between the mobile tablet gun system, the POS Store or Cloud Server and the corporate ERP Cloud system, providing access to chain-wide corporate data and continuous software redundancy. Wireless communication is secured using standard Wi-Fi Protected Access (WPA) and Wi-Fi Protected Access II (WPA2) wireless encryption methods. The OS and System Apps have the functionality to interface to and sometimes connect with the Firmware residing on the Primary PCB to conduct a wide variety of systemic and user-level functions. Some functions are integrated within the Primary PCB itself, and some directives are controlled by the Firmware, Systems Apps and/or Retail Apps and are sent through several specialized universal serial bus wiring harnesses to USB integrated devices including the USB barcode scanner input device and the USB MSR/EMV reader.

The Firmware of the Primary PCB carries a number of programmed instruction sets, some of which work in conjunction with the operating system and some with the Retail Apps residing on the mobile tablet device. For example, if a barcode scanner gun trigger of the mobile tablet gun system is pressed by the retail store employee according to the interest of a customer, this event is detected by the Retail Apps and Firmware of the Primary PCB and is communicated to the Retail Apps within the mobile tablet device. The Retail Apps and Firmware are integrated to interpret and parse the barcode read and format it in a manner that is readily recognized by the Retail Apps, which communicate with the POS Store or Cloud Server and/or the ERP Cloud system to obtain unique customer loyalty rewards data if available and available merchandise positions chain-wide, including the warehouse or special order from the vendor. The mobile tablet device displays the entire data on the screen, and the retail store employee may discuss these details to the customer allowing the customer to make a purchase decision. When the customer reaches a purchase decision of merchandise displayed on the mobile tablet device screen, the employee of the store touches an application icon to add the merchandise to the POS transaction. If shipping is required, the customer provides the customer name, address, contact telephone number, and email address if they are not already in the customer loyalty database.

The customer provides a payment card to the retail store employee which is dipped in the EMV slot or swiped in the MSR slot of the mobile tablet device (upper receiver). The payment card track data is encrypted using industry standard Triple DES with DUKPT by the EMV or MSR reader, then sent to a certified payment card processor for approval via a PCI compliant network connection. The employee allows the customer to sign their name on the device using a customer signature capture feature of the mobile POS application to complete the transaction. The mobile tablet device updates the corporate ERP Cloud system, adjusting the inventory on-hand of the merchandise, regardless of the fulfillment location of the sold merchandise, thus becoming visible across the retail chain upon completion of the transaction. The mobile tablet gun system can either locally print or send an email of the receipt to the customer's email address, which may be readily viewed on a smartphone carried by the customer.

This transaction could have happened at a checkout counter at the front of the store with the mobile tablet gun system docked in the POS docking station (trade name: POSiDock™) or it could have happened on a sales table in front of the store using the Tablet Gun™ connected via Wi-Fi or it could have happened out on a golf course with the mobile tablet gun system with pistol grip network connected via cellular network back to the golf course pro shop all while processing real-time POS sales transactions or ERP/store level inventory transactions. Further, the store clerk could have migrated the mobile tablet gun system between any of these transactions with each transaction being real-time and posting inventory position changes chain-wide. The key point is not letting the customer leave the "point of sale" simply because the item is not readily available and in possession, as today's customers will simply leave the store and make their purchase elsewhere or online. This aforementioned capability is especially well suited for use where large hard goods are sold and difficult to move around, or the selling area is extremely large or dispersed between indoor and outdoor sales areas.

The following paragraph details the elements, which collectively enable operation of the system as detailed hereinabove. The mobile tablet device of the mobile tablet gun system preferably comprises a custom-developed, industry-hardened device preferably having a 6" to 7" (approx.) diagonal LCD display, which can be attached to a variety of base form factors, through a base mount universal receiver having a removable, rotational coupling and a breakaway feature for durability purposes in the event the device is dropped or sustains a significant impact. The mobile tablet device has a custom "hot swappable" primary lithium ion battery along with a custom integrated lithium-ion backup battery integrated within the mobile tablet device housing, a USB payment card reader supporting both a magnetic stripe reader (MSR) and a Europay MasterCard Visa (EMV) payment card reader mounted on one edge of the mobile tablet device and a USB barcode scanner input device incorporated within the pistol grip base housing, being operable by pressing a trigger, also incorporated within the pistol grip base housing.

The mobile tablet device Retail Apps, System Apps and Firmware within the Primary PCB preferably operate on Microsoft Windows 10 OS. The mobile tablet device (upper receiver) is connected to each base housing concept through a base mount universal receiver with rotatable coupling and breakaway feature in three of the four base housing concepts, including the Tablet Gun™, a wearable mobile tablet gun system (Spider Gun™) and a handheld tablet, each with a USB barcode scanner integrated into the base, except for the handheld housing, which has the USB barcode scanner integrated into the mobile tablet device (upper receiver) directly below the EMV/MSR reader. The rotational coupling permits changing the orientation of the mobile tablet device in the portrait mode or in the landscape mode of the mobile tablet device display screen as warranted by specific user applications and the breakaway feature assists in the survivability of drops and impacts of the mobile tablet gun system while docked with the "pistol grip" feature. The upper receiver has an industry standard EMV/MSR payment card reader input device with LED lighting to assist the user in accessing the device integrated along the short edge of the mobile tablet device for easy access by the user regardless of which base housing is selected for use.

A key component of the invention is the Firmware that has been programmed within the Primary PCB. The Firmware is coded into the Primary PCB which is integrated into the design of the mobile tablet device to process commands issued by the OS, System Apps, and Retail Apps in order to manage and/or control a number of important systemic, OS and operational functions making the mobile tablet device highly advantageous.

Systemic functionality and control managed by the System Apps, Firmware and Primary PCB include: The MIPI based LCD touchscreen display, interpreting the accelerometer to manage screen orientation between "portrait" and "landscape" viewing mode of the LCD display, LED status lights for the primary lithium ion battery pack which indicate battery life and charge/discharge status, mobile tablet device "sleep mode" power management both conserve battery life and reduce "wake up" time from "sleep mode", smart charging of both the primary and backup batteries including the backup battery capable of being charged from the primary battery to ensure backup battery life is full until needed, monitoring the temperature of both cores of the Intel Atom dual core processor and the primary battery pack with integrated automatic battery charging shutdown in the event of overheating, Advanced Configuration and Power Interface (ACPI) BIOS integration from Intel Atom Dual Core Processor to the OS, a USB barcode scanner for reading one and two dimensional barcodes for processing a scan operation of an inventory item or groups of items, a USB MSR/EMV payment card reader for processing payment cards via an encrypted payment card network to industry standard payment card processors, LED lighting for the EMV reader designed to direct user operations during chip based payment card processing and, optionally, a Near Field Communications (NFC) module for processing payment cards, designed for future use as the retail industry acceptance of this payment card device becomes more prevalent.

Inasmuch as the Microsoft Windows 10 OS was inherently designed for industry standard tablets, laptops and desktops using an LVDS video signal interface between the processor and LCD display, running Windows 10 OS on the mobile tablet device, similar in its technology footprint as an industry standard smartphone, requires inventive Retail Apps, System Apps, Firmware and a Primary PCB to overcome the challenges presented by using Microsoft's Windows 10 OS within a mobile tablet device integrated with a MIPI based video signal LCD touchscreen display. Further, it was important that the user interface on the mobile tablet device running under Windows 10 OS did not require additional user training beyond what is necessary to operate a standard Windows 10 OS tablet, laptop or desktop computer. This requirement was accomplished through Retail Apps that uniquely and inventively enhanced user IO features and functionality typically found on smart cell phones in such a way that the user inherently understands how to use the mobile tablet device without additional training beyond basic Windows 10 OS training.

Since many chain retailers will have a mix between legacy fixed POS terminals running Windows 10 OS operating in the same store and space as the mobile tablet gun system, this feature is extremely valuable to chain store owners as store employees can migrate between legacy POS terminals and the mobile tablet gun system without having to retrain their staff. Additionally, the majority of retailers operating industry standard POS terminals today are typically using a version of Microsoft Windows as their core OS; however, most mobile POS systems available in the marketplace today are either iOS-based or Android-based. This OS "mismatch" has a number of issues that challenge many chain retailers today including: Purchasing, managing, supporting and upgrading multiple POS and RF inventory applications along with their annual software maintenance contracts, managing, supporting and upgrading multiple operating systems (Windows, iOS, Android, etc.), purchasing multiple POS hardware and inventory data terminals along with their hardware maintenance contracts and training an ever-changing employee base on multiple POS and inventory data terminals. Since a chain retailer's store operation simply must keep its store systems up and running no matter the cost or effort, the chain retailer must have an IT Department that can absolutely support an ever-expanding store systems mix of technology without fail, much like a bank requires, as downed systems means no revenue from the store. This is one of the two primary reasons chain retailers are sometimes slow to upgrade their store systems technology. The other reason is driven by costs incurred when upgrading store systems technology, given the multiples of a chain of stores.

In accordance with the present invention, this complicated store systems "hodge-podge" of technology can be reduced down to one mobile tablet gun system platform with its multiple base form factors and increased customer service levels. Advantageously, the mobile tablet gun system described and claimed herein can run the front of the store as efficiently as it can run the back of the store all under one unique store systems platform.

Operationally, the Retail Apps, System Apps and Firmware, either installed on or integrated with the Primary PCB, work together within the mobile tablet gun system through its specialized inventive hardware platform and multiple base form factors to leverage both standard and unique Retail Apps including point of sale, customer specific data management, price management and ERP Cloud/store-level inventory management applications. Store personnel can quickly and easily migrate between POS customer sales transactions, ERP Cloud-based customer fulfillment applications and ERP Cloud/store based inventory processes without work loss or delay as the store personnel can "hot key" between these advanced consortiums of Custom Retail Apps. Ease of use and increased customer service levels are further enhanced. The mobile tablet gun instantly and seamlessly migrates between network architectures including Ethernet, Wi-Fi and Cellular, as well as technically connecting and disconnecting between Ethernet, Serial, USB and Bluetooth POS peripheral devices controlled by Custom Configuration settings, as warranted and desired by the retail enterprise. Ultimately, the mobile tablet gun system reduces the overall "footprint" and cost. The system is equally adept at "customer facing" POS transaction management and "back office" inventory-based tasks and transactions while providing an increased level of customer service without additional store personnel.

In one embodiment, the mobile tablet gun system of the present invention comprises: i) a mobile tablet gun system capable of receiving a mobile tablet device with a 6" to 7" (approx.) diagonal LCD touchscreen display having System Apps and Firmware integrated within the Primary PCB running on Microsoft Windows OS currently known as Windows 10, attachable to multiple base form factors through a base mount universal receiver having a removable, rotational coupling with a breakaway feature in the event of a significant forceful impact; ii) a mobile tablet device with a 6" to 7" (approx.) diagonal LCD touchscreen display having System Apps and Firmware integrated within the Primary PCB running on Microsoft Windows OS currently known as Windows 10 with the same Retail Apps executable (EXE) files that run on industry standard tablets, laptops and desktops and requiring no additional user training to operate the mobile tablet device; iii) a mobile tablet device with a 6" to 7" (approx.) diagonal LCD touchscreen display having System Apps and Firmware integrated within the Primary PCB running on Microsoft Windows OS currently known as Windows 10 providing typical features found in a 5" to 6" diagonal industry standard mobile phone such as rotational screen, "pop up" keyboard and hot swappable USB and Bluetooth devices; iv) a mobile tablet device with a 6" to 7" (approx.) diagonal LCD touchscreen display having System Apps and Firmware integrated within the Primary PCB running on Microsoft Windows OS currently known as Windows 10 operating on a Mobile Industry Processor Interface (MIPI) video signal interface based 6" to 7" (approx.) LCD touchscreen display powered by an Intel Atom dual-core processor designed for use with a Low Voltage Display Signal (LVDS) video signal interface based LCD touchscreen display; v) a mobile tablet device with a 6" to 7" (approx.) diagonal LCD touchscreen display having System Apps and Firmware integrated within the Primary PCB running on Microsoft Windows OS currently known as Windows 10 capable of receiving remote Windows Updates substantially the same as an industry standard tablet, laptop or desktop POS terminal can; vi) a mobile tablet device with a 6" to 7" (approx.) diagonal LCD touchscreen display having System Apps and Firmware integrated within the Primary PCB running on Microsoft Windows OS currently known as Windows 10 having Ethernet communicative capability to the POS Store or Cloud Server and the ERP Cloud system in a retail store while docked in the POSiDock™; vii) a mobile tablet device with a 6" to 7" (approx.) diagonal LCD touchscreen display having System Apps and Firmware integrated within the Primary PCB running on Microsoft Windows OS currently known as Windows 10 having Wi-Fi communicative capability to the POS Store or Cloud Server and the ERP Cloud, attached to a pistol grip base housing through a base mount universal receiver with removable, rotational coupling and breakaway feature, forming a mobile tablet gun system carried by an employee within a retail store when the mobile tablet gun system is removed from the POSiDock™ and in range of the Wi-Fi network; viii) a mobile tablet device with a 6" to 7" (approx.) diagonal LCD touchscreen display having System Apps and Firmware integrated within the Primary PCB running on Microsoft Windows OS currently known as Windows 10 having wireless cellular communicative capability to the POS Store or Cloud Server and the ERP Cloud, attached to a pistol grip base housing through a base mount universal receiver with removable rotational coupling and breakaway feature, forming a mobile tablet gun system carried by an employee both within a retail store and well beyond its premises when removed from the POSiDock™ and is no longer in range of the Wi-Fi network; ix) a mobile tablet device with a 6" to 7" (approx.) diagonal LCD touchscreen display having System Apps and Firmware integrated within the Primary PCB running on Microsoft Windows OS currently known as Windows 10 having a wide variety of specialized systemic functions including: Accelerometer control for screen orientation by application, battery and processor temperature monitoring, color-coded battery power metering and charging schemas for primary and backup lithium-ion battery packs, processor "sleep mode" management for optimizing battery life and quick return of system availability, Advanced Configuration and Power Interface (ACPI) BIOS integration from Intel Atom Processor to Windows 10 OS; x) a mobile tablet device with a 6" to 7" (approx.) diagonal LCD touchscreen display having System Apps and Firmware integrated within the Primary PCB running on Microsoft Windows OS currently known as Windows 10 having the systemic capacity to integrate an Intel Atom Processor Chip Set using a Low Voltage Differential Signal (LVDS) video signal interface to a Mobile Industry Processing Interface (MIPI) video signal interface based LCD touchscreen display through its Firmware and Primary PCB; xi) said mobile tablet device with a 6" to 7" (approx.) diagonal LCD touchscreen display having Custom Retail Apps, System Apps and Firmware integrated within the Primary PCB running on Microsoft Windows OS currently known as Windows 10 capable of commanding and controlling a USB barcode scanner input device having a scanner trigger for activating a scan operation by an employee of a retail establishment and retrieving an inventory item for wide variety of Retail App functions and processes; xii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 having an EMV/MSR reader for processing customer payment card data by an employee or customer of a retail establishment, communicating with a payment card gateway to process customer payment card data through the proper secured bank card processor via a PCI certified network; xiii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 communicating with said POS Store or Cloud Server and corporate ERP Cloud to obtain detailed information of the merchandise scanned, its inventory, selling price electronic and physical coupons, promotions, and customer loyalty data available; xiv) said mobile tablet device with a 6" to 7" (approx.) diagonal LCD touchscreen display having Custom Retail Apps, System Apps and Firmware integrated within the Primary PCB running on Microsoft Windows OS currently known as Windows 10 being operative to enable an employee of the retail establishment to communicate to a customer, the description, price, electronic and physical coupons, promotion data, and. customer loyalty rewards data available to the customer; xv) said mobile tablet device with a 6" to 7" (approx.) diagonal LCD touchscreen display having Custom Retail Apps, System Apps and Firmware integrated within the Primary PCB running on Microsoft Windows OS currently known as Windows 10 facilitating a transaction wherein said customer decides to purchase the merchandise and the employee accessing a purchase routine of said mobile POS application software, enters customer name, address and e-mail address if needed, and swipes customer data, and said input device communicating formatted customer payment card data securely to said POS Store or Cloud Server; xvi) said mobile tablet device with a 6" to 7" (approx.) diagonally LCD touchscreen display having Custom Retail Apps, System Apps and Firmware integrated within the Primary PCB running on Microsoft Windows OS currently known as Windows 10 contacting a PCI certified bank card processor authorizing said purchase and communicating to the mobile tablet device that the customer has purchased the scanned merchandise; xvii) said mobile tablet device with a 6" to 7" (approx.) diagonal LCD touch screen display having Custom Retail Apps, System Apps and Firmware integrated within the Primary PCB running on Microsoft Windows OS currently known as Windows 10 communicating directly with the ERP Cloud to adjust said product inventory, send a receipt to the e-mail address of the customer, and print a hard copy of the transaction on a store network printer; xviii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 being operative, in the event that said authorization is denied, to inform the employee of this credit denial, so that said customer is informed and can provide alternative payment; xix) said mobile tablet device with a 6" to 7" (approx.) diagonal LCD touchscreen display having Custom Retail Apps, System Apps and Firmware integrated within the Primary PCB running on Microsoft Windows OS currently known as Windows 10, being operative to carry out daily store-level inventory management functions for such tasks as physical inventory, cycle counting, inventory receiving, store to store transfers, return to vendor, product re-ticketing; xx) said mobile tablet device with a 6" to 7" (approx.) diagonal LCD touchscreen display having Custom Retail Apps, System Apps and Firmware integrated within the Primary PCB currently running on Microsoft Windows 10 OS and being operative to facilitate a transaction whereby the customer purchases merchandise from any retail store employee having a mobile tablet gun system operating on a mobile tablet device with a 6" to 7" (approx.) diagonally LCD touchscreen display running Windows 10 OS and receives full product details, price, electronic and physical coupons, promotions and customer loyalty data available and transacts the customer purchase in a friendly atmosphere without having any need to bring the merchandise to a central checkout station and waiting in queue to check out.

In the preferred embodiment of the mobile tablet gun system currently running Microsoft Windows 10 OS on a mobile tablet device with an approximately 6" diagonal LCD touchscreen display, there are a number of clear advantages that significantly reduce the overall hardware and software footprint within a retail establishment and provide store personnel technology that technically manage virtually the entire store seamlessly, instantly and without disruption to transactional flows in progress. A store clerk in the middle of a physical inventory or ticketing merchandise on the sales floor shelves can "hot key" to the POS application to immediately service a customer that just walked up to them on the sales floor. After servicing the customer, the clerk instantly "hot keys" back to the inventory application and continues with the inventory or ticketing merchandise. Today, chain retailers typically use two different store system devices to accomplish both of these tasks. One such store system device is an industry standard RF inventory scan gun or terminal made by such companies as Honeywell or Zebra, and the other is an industry standard fixed or mobile POS term Hai provided by many different vendors. Today's retailer can ill afford to spend even one more dollar than necessary to service their customers as eCommerce has reduced already thin margins in the brick and mortar store based world forcing many retailers out of business. Reducing a "hodge-podge" of store systems technology to ONE mobile tablet gun system will significantly reduce store systems cost and increase customer service in the brick and mortar retail world.

Figure 1B:
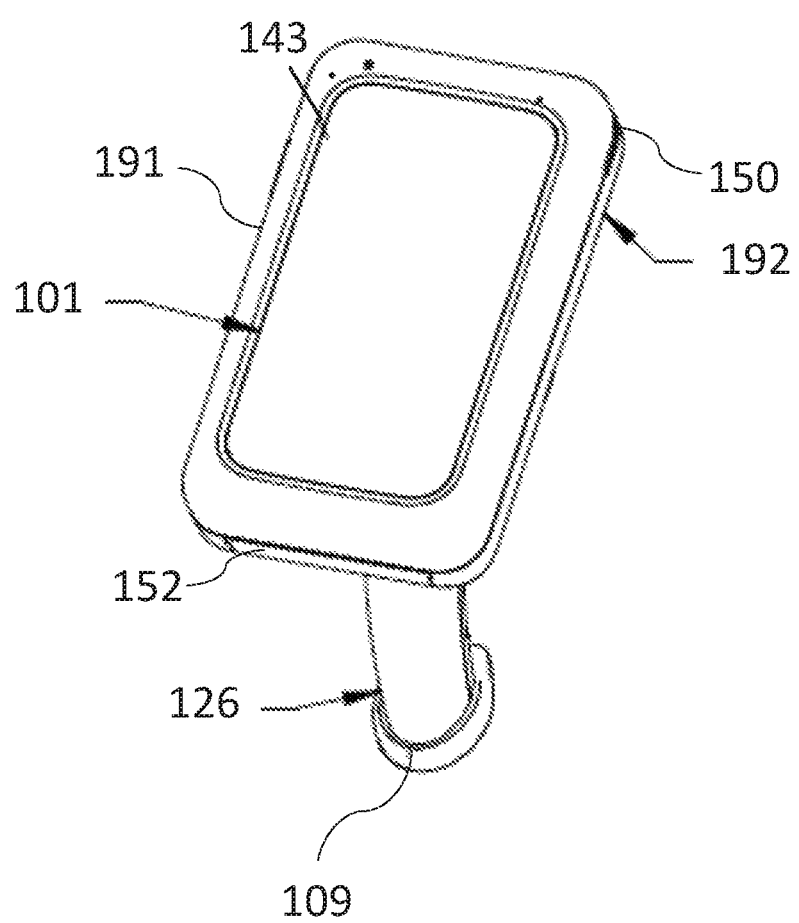
Figure 1C:
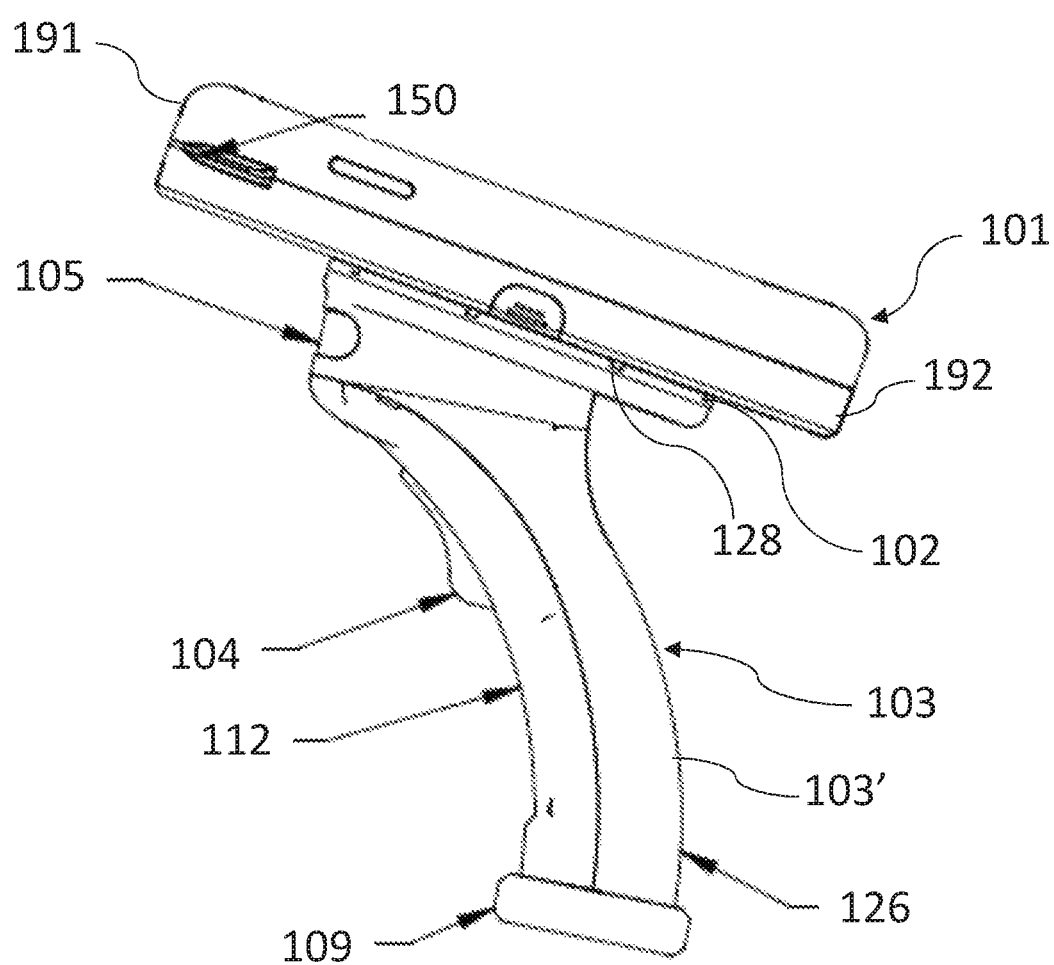
Figure 1D:
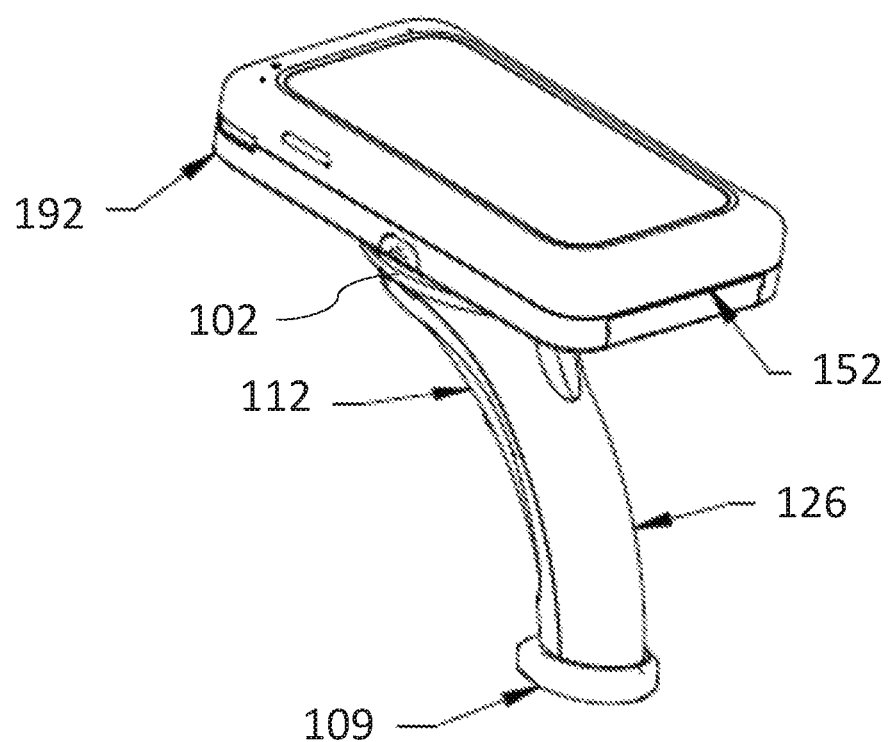

FIG. 1a is a side view of an embodiment of the mobile tablet gun system showing a mobile tablet docked through a base mount universal receiver to a pistol grip base housing operating in concert under the enterprise resource planning mobile application's environment, shown generally at 100. FIG. 1b is a top view of the embodiment of FIG. 1a. FIG. 1c is a front top-side view of the embodiment of FIG. 1a. FIG. 1d is a back top-side view of the embodiment of FIG.

Figure 1E:
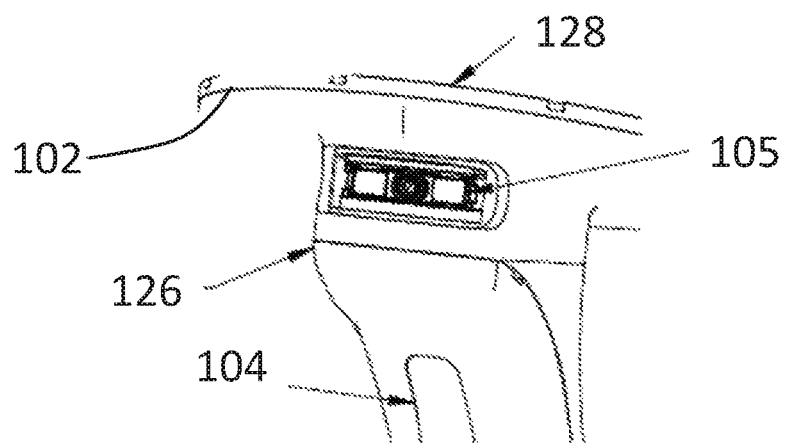
Figure 1F:
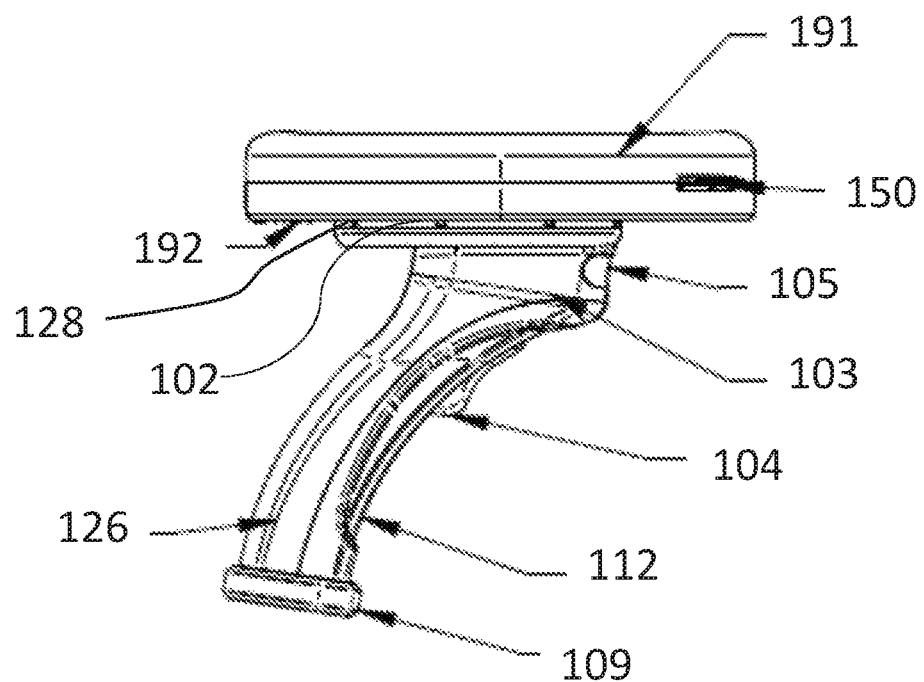
FIG. 1f is a back-side view of an embodiment of the mobile tablet gun system.
Figure 1G:
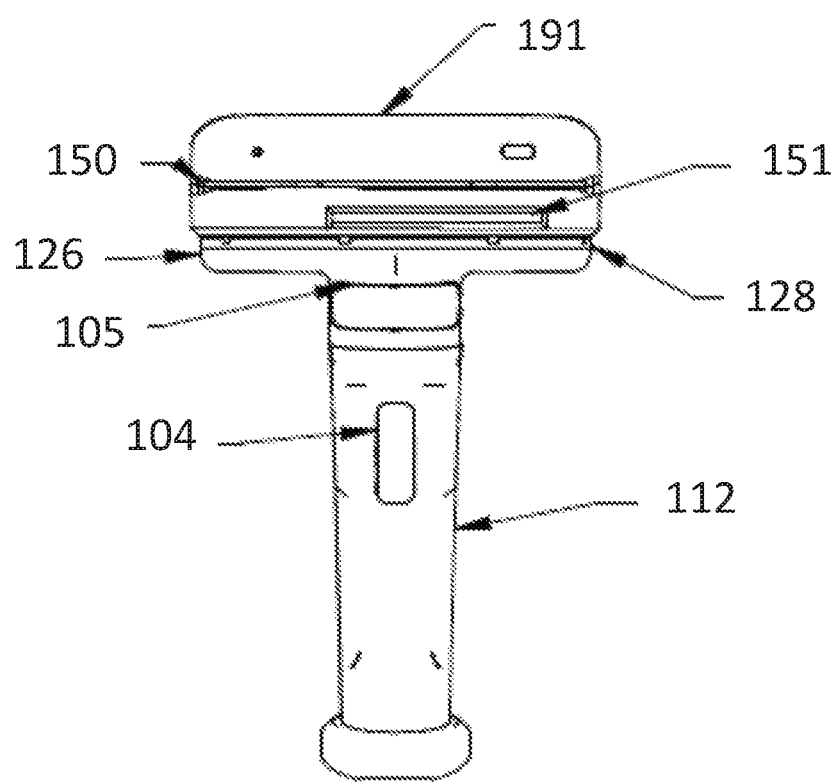
Figure 1H:
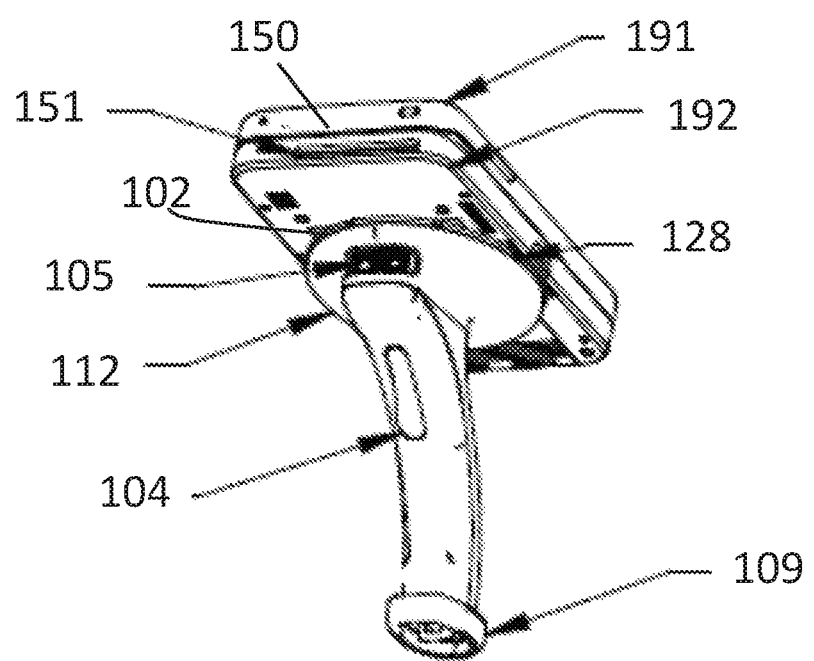

1a. FIG. 1e is a cross-sectional view taken at A from FIG. 1a. FIG. 1f is a back-side view of an embodiment of the mobile tablet gun system. FIG. 1g is a front view of the embodiment of FIG. 1a. FIG. 1h is a bottom view of the embodiment of FIG. 1a.

Referring to FIGS. 1a-1h, the mobile tablet gun system 100 has a mobile tablet device 101 removably mounted through a base mount universal receiver having a removable, rotational coupling on top wall 102 of a base form factor, herein shown as a tablet gun 103. Rotational coupling on top wall 102 includes a breakaway feature in the event of a significant forceful impact for removable attachment and electronic integration with multiple base form factors, herein shown as a tablet gun 103. As best viewed in FIGS. 2a-2h, and discussed hereinafter, rotational coupling on top wall 102 includes a rotation stopping plate 128.

Mobile tablet device 101 includes a bottom housing 192 and a top housing 191. Top housing 191 of mobile tablet device 101 preferably includes 5.7" display 143 with glass and capacitive touch. Rotational coupling on top wall 102 permits the alignment and rotation of the mobile tablet device to/from portrait and/or landscape mode. The figure shows the mobile tablet device in the portrait mode.

The pistol grip base housing 103 with a trigger 104, which activates a barcode scanner 105 having a bar code scanner lens. The pistol grip itself 103' is constructed having a front grip 112 mated with a rear grip 126. Rear grip 126 has a top wall 102 with a rotational coupling unit integrated therein and a lanyard assembly 109 located on the bottom thereof forming an integral unilateral unit/one piece unit. When front grip 112 and rear grip 126 are mated with one another, lanyard assembly 109 located at the bottom of rear grip 126 form the bottom of the pistol grip base housing 103. Magnetic stripe reader (MSR) 150 is integrated in a front side wall, short edge, of the mobile tablet device 101 for executing payment card transactions. Europay, MasterCard and Visa (EMV) chip technology, is integrated in a front side wall under the MSR 150 on the short edge of the mobile tablet device 101 at 151 for executing transactions. In landscape mode, the EMV/MSR reader 151, 150 is perpendicular to the barcode scanner 105; in portrait mode, the EMV/MSR reader 151, 150 is parallel to the barcode scanner 105 as shown in FIG. 1a. In one embodiment, the base mount universal receiver with rotational coupler 102 is preferably connected by four spring loaded latches with corresponding catches located on the underside of both sides of the mobile tablet device 101 and is also not visible in this figure since it is incorporated within the rotatable connection between the mobile tablet device and the pistol grip base housing (see FIGS. 3b, 3c and 3f).

A plurality of applications is present in the mobile tablet device display screen 143. In one aspect, the mobile tablet device includes a ~5.7" display with glass and capacitive touch. Preferably, the mobile tablet device 101 has a 6" to 7" (approx.) diagonal LCD touchscreen display. The mobile tablet device 101 preferably has System Apps and Firmware integrated within the Primary PCB running on Microsoft Windows OS currently known as Windows 10, attachable to multiple base form factors through the base mount universal receiver having removable, rotational coupling with a breakaway feature in the event of a significant forceful impact. In another embodiment, mobile tablet device 101 is integrated with System Apps and Firmware integrated within the Primary PCB running on Microsoft Windows OS currently known as Windows 10 with the same Retail Apps executable (EXE) files that run on industry standard tablets, laptops and desktops and requiring no additional user training to operate the mobile tablet device. Alternatively, mobile table device 101 System Apps and Firmware integrated within the Primary PCB running on Microsoft Windows OS currently known as Windows 10 provides typical features found in a 5" to 6" diagonal industry standard mobile phone such as digital screen rotational, "pop up" keyboard and hot-swappable USB and Bluetooth devices.

In yet another embodiment, mobile table device 101 includes System Apps and Firmware integrated within the Primary PCB running on Microsoft Windows OS currently known as Windows 10 operating on a Mobile Industry Processor Interface (MIPI) video signal interface, preferably based 6" to 7" (approx.) LCD touchscreen display powered by an Intel Atom dual-core processor designed for use with a Low Voltage Display Signal (LVDS) video signal interface based LCD touchscreen display. In another embodiment, the mobile tablet device 101 is capable of receiving remote Windows Updates substantially the same as an industry standard tablet, laptop or desktop POS terminal can. Preferably, the mobile tablet device 101 includes Ethernet, Wi-Fi, and/or wireless communicative capability to the POS Store or Cloud Server and the ERP Cloud system in a retail store while docked in the POS docking station (trademark: POSiDock™).

The mobile tablet device 101 preferably includes a wide variety of specialized systemic functions including: Accelerometer control for screen orientation by application, battery and processor temperature monitoring, color-coded battery power metering and charging schemas for primary and backup lithium-ion battery packs, processor "sleep mode" management for optimizing battery life and quick return of system availability, Advanced Configuration and Power Interface (ACPI) BIOS integration from Intel Atom Processor to Windows 10 OS. The mobile tablet device 101 additionally preferably includes systemic capacity to integrate an Intel Atom Processor Chip Set using a Low Voltage Differential Signal (LVDS) video signal interface to a Mobile Industry Processing Interface (MIPI) video signal interface-based LCD touchscreen display through its Firmware and Primary PCB. The mobile tablet device 101 is capable of commanding and controlling a USB barcode scanner input device having a scanner trigger for activating a scan operation by an employee of a retail establishment and retrieving an inventory item for wide variety of Retail App functions and processes. Mobile tablet device 101 also includes an EMV/MSR reader for processing customer payment card data by an employee or customer of a retail establishment, communicating with a payment card gateway to process customer payment card data through the proper secured bank card processor via a PCI certified network, and obtains detailed information of the merchandise scanned, its inventory, selling price electronic and physical coupons, promotions, and customer loyalty data available.

In another aspect, the mobile tablet device 101 includes a 6" to 7" (approx.) diagonal LCD touchscreen display having Custom Retail Apps, System Apps and Firmware integrated within the Primary PCB running on Microsoft Windows OS currently known as Windows 10 being operative to enable an employee of the retail establishment to communicate to a customer, the description, price, electronic and physical coupons, promotion data, and customer loyalty rewards data available to the customer. Transactions are facilitated by the mobile tablet device 101, wherein said customer decides to purchase the merchandise and the employee accessing a purchase routine of said mobile POS application software, enters customer name, address and e-mail address if needed, and swipes customer data, and said input device communicating formatted customer payment card data securely to said POS Store or Cloud Server. Contacting a PCI certified bank card processor is carried out his carried out by the mobile tablet device 101 authorizing said purchase and communicating to the mobile tablet device that the customer has purchased the scanned merchandise. The mobile tablet device 101 communicates directly with the ERP Cloud to adjust said product inventory, send a receipt for to the e-mail address of the customer, and print a hard copy of the transaction on a store network printer. The mobile tablet device 101 is operative, in the event that said authorization is denied, to inform the employee of this credit denial, so that said customer is informed and can provide alternative payment. In addition, the mobile tablet device 101 is operative to carry out daily store-level inventory management functions for such tasks as physical inventory, cycle counting, inventory receiving, store to store transfers, return to vendor, product re-ticketing and to facilitate a transaction whereby the customer purchases merchandise from any retail store employee having a mobile tablet gun system. Receiving full product details, price, electronic and physical coupons, promotions and customer loyalty data available and transacts the customer purchase in a friendly atmosphere without having any need to bring the merchandise to a central checkout station and waiting in queue to check out.

There are a number of specifically designed programmed applications that allow the mobile tablet device to command the USB input devices through the specialized universal serial bus wiring harness to perform various functions typical to scanner operations and EMV/MSR reader operations. Running of the specially programmed mobile POS application, StoreMS Mobile™ is initiated and a command is sent to the FIRMWARE to acquire a barcode scan. The mobile tablet device in this mode is ready to receive the barcode data from the USB scanner input device and communicates with the POS Store or Cloud Server at the retail facility and the corporate ERP system to obtain specific product information such as, product availability within the store and chain, price and any promotions available, available physical and electronic coupons and customer loyalty information. The employee of the retail organization presents the data that is related to the particular item of interest to the customer. When the customer decides to purchase the particular item scanned, the employee of the retail organization uses the mobile POS application to process the sales transaction, if needed for shipping, pertinent customer information is taken or their records are updated if they are already a loyalty rewards customer. At tender, this POS transaction can open the cash drawer wirelessly for cash transactions and can also launch a request for processing the sale using a customer payment card. The customer's payment card is dipped or swiped via the EMV/MSR reader input device, which is located on the short edge of the mobile tablet device. All pertinent customer payment card data is encrypted by the EMV/MSR reader and the FIRMWARE communicates the encrypted data through the specialized universal serial bus wiring harness to the mobile tablet device.

The mobile POS application, StoreMS Mobile™, present in the mobile tablet device communicates all pertinent customer payment card data, using a PCI compliant encrypted Ethernet, Wi-Fi connection or wireless cellular connection, to the POS Store or Cloud Server. The POS Store or Cloud Server contacts the bank card processor through a PCI certified network connection for payment card authorization for the purchase. If the purchase is authorized, this information is sent to the mobile tablet device display screen for customer signature using an integrated signature capture application built within the mobile POS application on the mobile tablet device and the customer is allowed to take possession of the merchandise purchased. The POS Store or Cloud Server can send a receipt for the purchase to the e-mail address of the customer if desired. The POS Store or Cloud Server or POS cloud server records this purchase and instructs the corporate ERP system to adjust the inventory data for the particular item sold, becoming visible chain-wide. A hard copy of the receipt can also be printed in a central printer present in the retail establishment. If the credit purchase is denied, the mobile tablet device displays this credit request decline. The employee of the retail organization informs the customer of this credit purchase rejection and requests another form of payment. Thus the purchase of merchandise by a customer is accomplished by StoreMobile POS™ by an employee having a mobile tablet gun system anywhere in the store or beyond the store, without the customer having to bring the merchandise to a sales counter and wait in line to consummate the purchase; and, the inventory of any item in the retail establishment is always current and available for purchase transactions carried out by a plurality of sales personnel working with a plurality of customers at a wide variety of locations within the retail establishment.

Figure 2A:
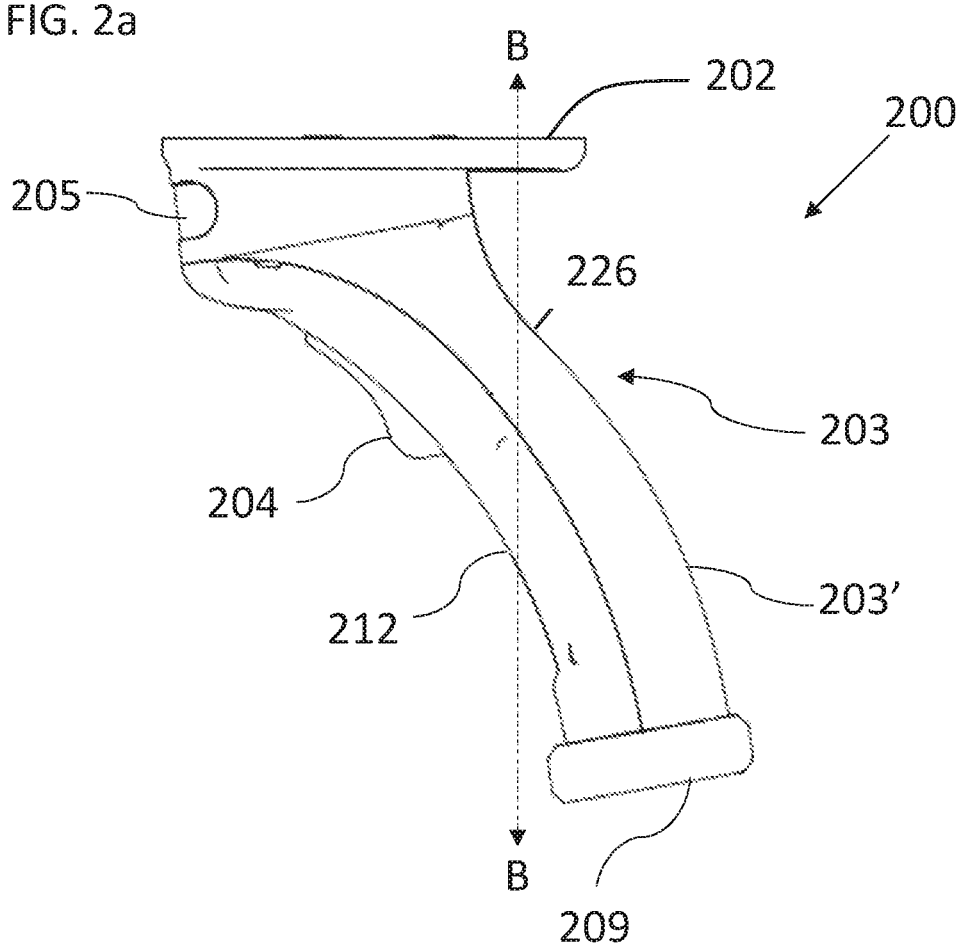
FIG. 2a is a side view of an embodiment of the pistol grip base housing.
Figure 2B:
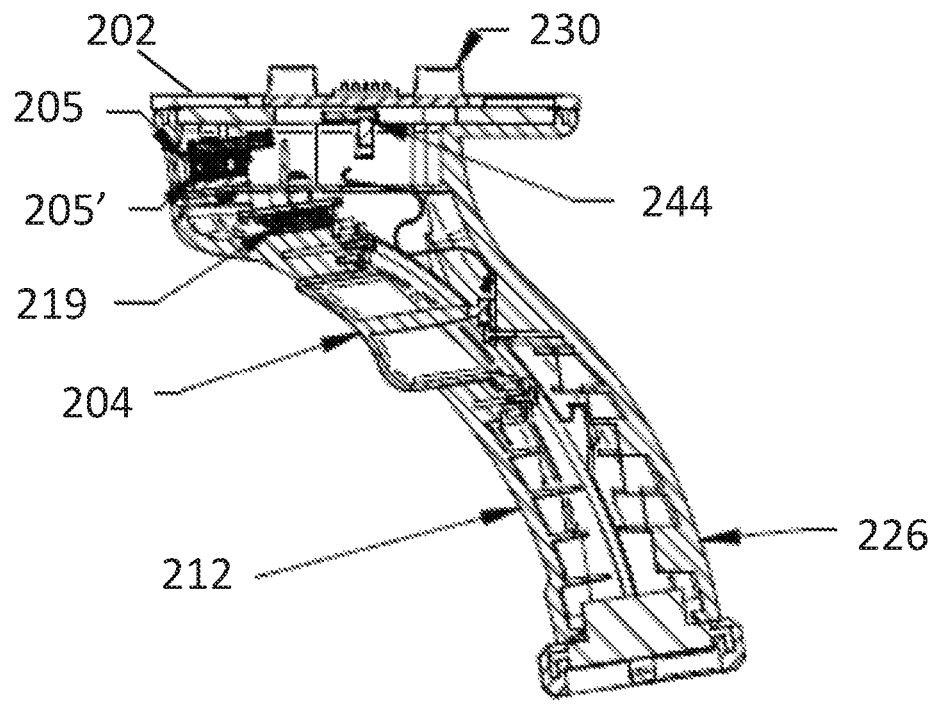
FIG. 2b is a cross-sectional side view of the pistol grip base housing of FIG. 2a, taken along B-B.
Figure 2C:
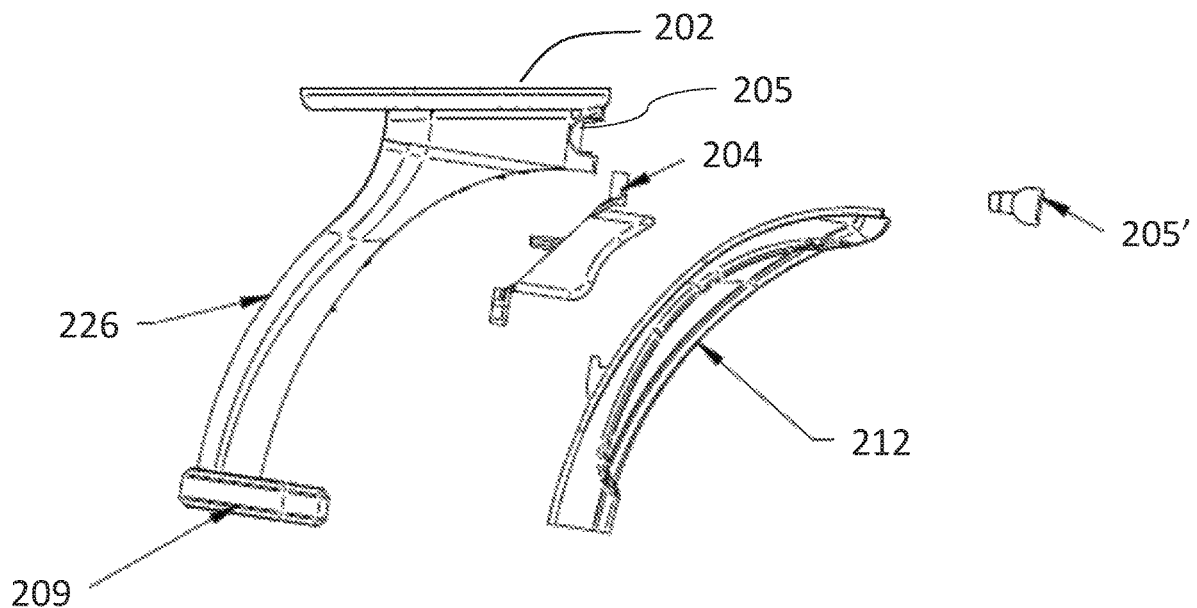
Figure 2D:
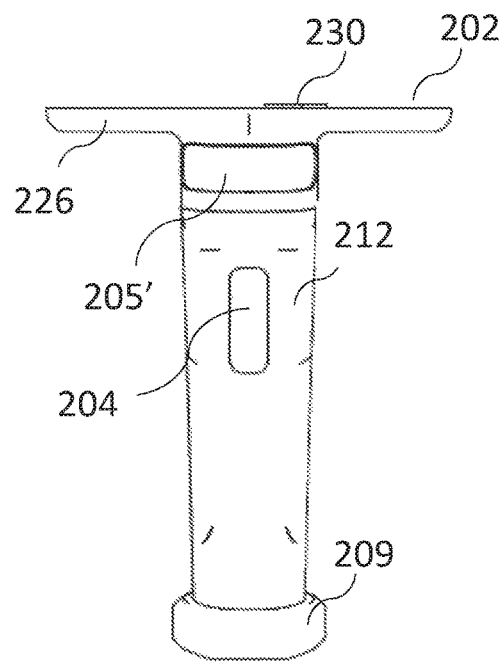
Figure 2E:
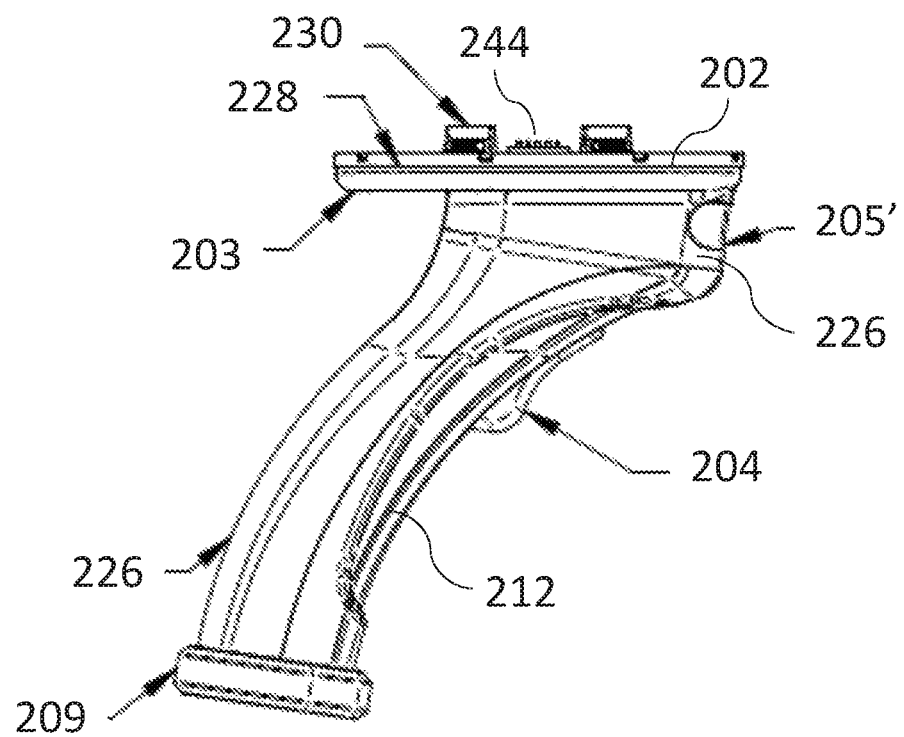
Figure 2F:
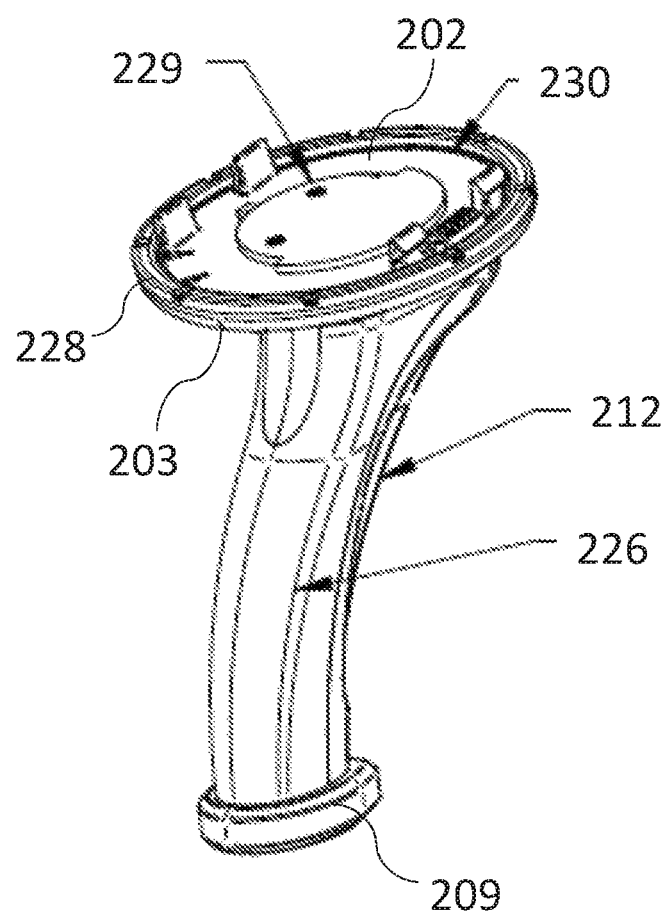
Figure 2G:
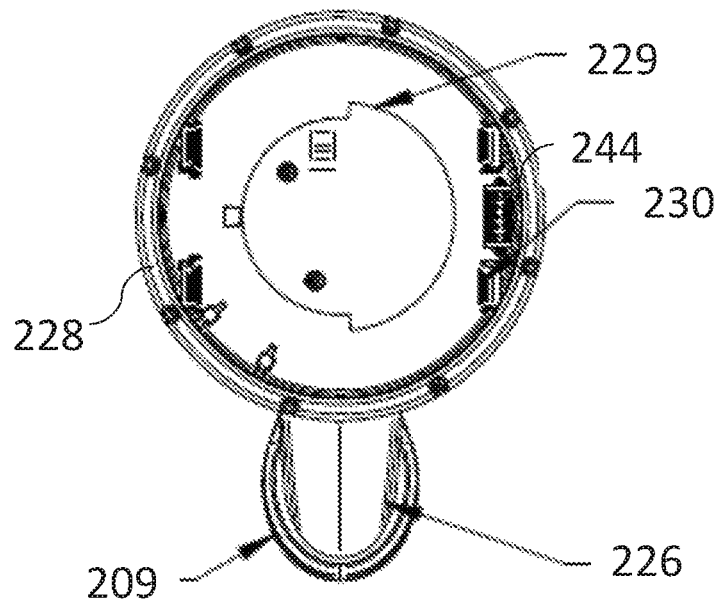
Figure 2H:
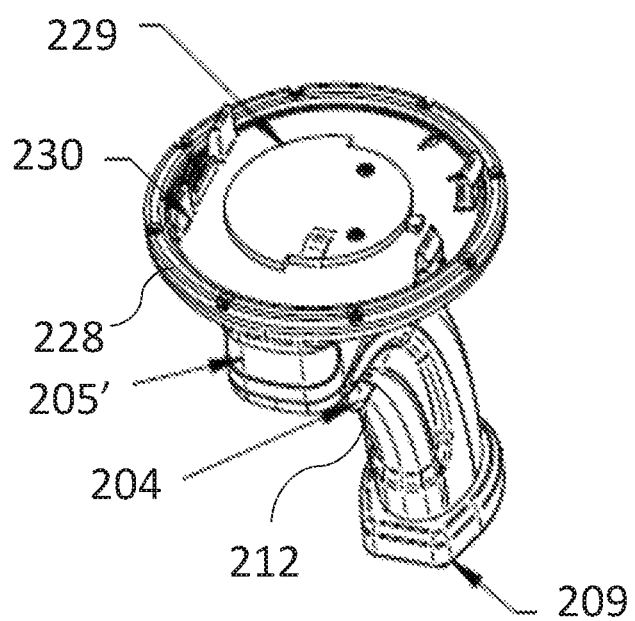

FIG. 2*a* is a side view of an embodiment of the pistol grip base housing with the mobile tablet removed, showing the components and the assembly, shown generally at 200. FIG. 2*b* is a cross-sectional side view of the pistol grip base housing of FIG. 2*a*, taken along B-B. FIG. 2*c* is a side view of the assembly of the pistol grip base housing of FIG. 2*a*. FIG. 2*d* is a front view of the assembly of the pistol grip base, housing of FIG. 2*a*. FIG. 2*e* is an assembled side view of an embodiment of the pistol grip base housing of FIG. 2*a*. FIG. 2*f* is a top side view of an embodiment of the pistol grip base housing of FIG. 2*a*. FIG. 2*g* is a top view of an embodiment of the pistol grip base housing of FIG. 2*a*. FIG. 2*h* is another top view of an embodiment of the pistol grip base housing of FIG. 2*a*.

Referring to FIGS. 2*a*-2*h*, a base form factor adapted to removably mount the subject mobile tablet device through a base mount universal receiver is shown herein as pistol grip base housing 203. The pistol grip itself 203' consists of two half's, the front half 212 and the back half 226 with a trigger 204 that activates a barcode scanner 205 covered with an exterior bar code scanner lens 205'. A bar codes scanner interface PCB 219 communicates with bar code scanner 205 upon activation of trigger 204. The pistol grip 203' is constructed having a front grip 212 mated with a rear grip 226. Rear grip 226 has a top wall 202 with a top base plate 203, and a lanyard assembly 209 located on the bottom thereof forming an integral unilateral unit/one piece unit. When front grip 212 and rear grip 226 are mated with one another, lanyard assembly 209 located at the bottom of rear grip 226 form the bottom of pistol grip 203'. Top wall 202 has a rotational coupling unit integrated therein. Rotational coupling on top wall 202 is formed by way of a rotation stopping plate 228, rotation stop plate 229 and rotation base plate 230. A base mount universal receiver is integrated within the rotational coupling unit on top wall 202 via a tablet gun interface PCB 244 and preferably includes a breakaway feature in the event of a significant forceful impact for removable attachment and electronic integration between the mobile tablet device and the pistol grip base housing 203.

Figure 3A:
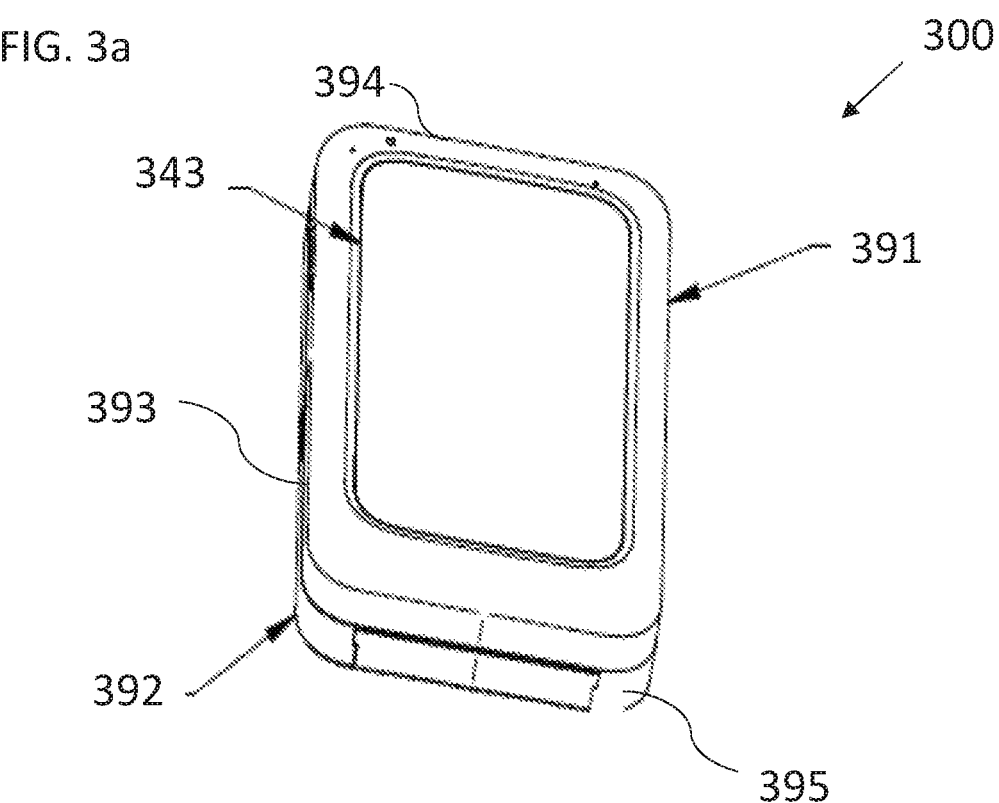
FIG. 3a is a top view of an embodiment of the mobile tablet adapted to be docked through a base mount universal receiver to a pistol grip base housing operating in concert under the enterprise resource planning mobile application's environment.
Figure 3B:
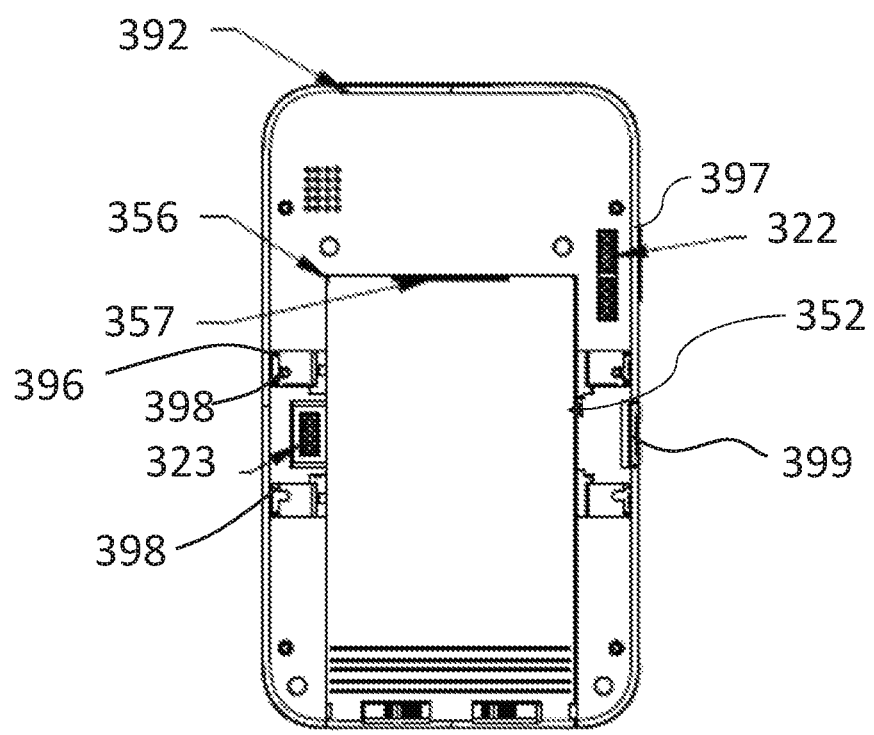
Figure 3C:
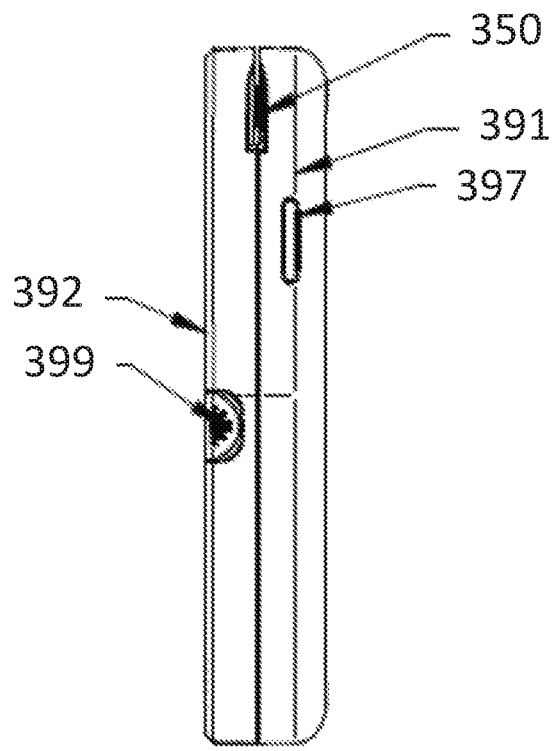
Figure 3D:
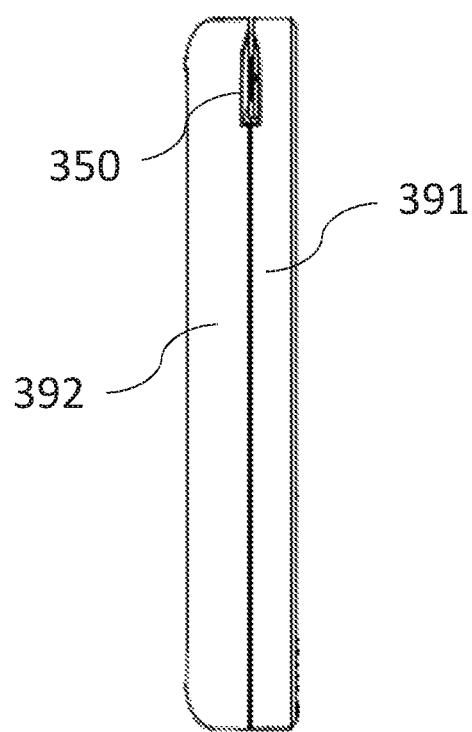
Figure 3E:
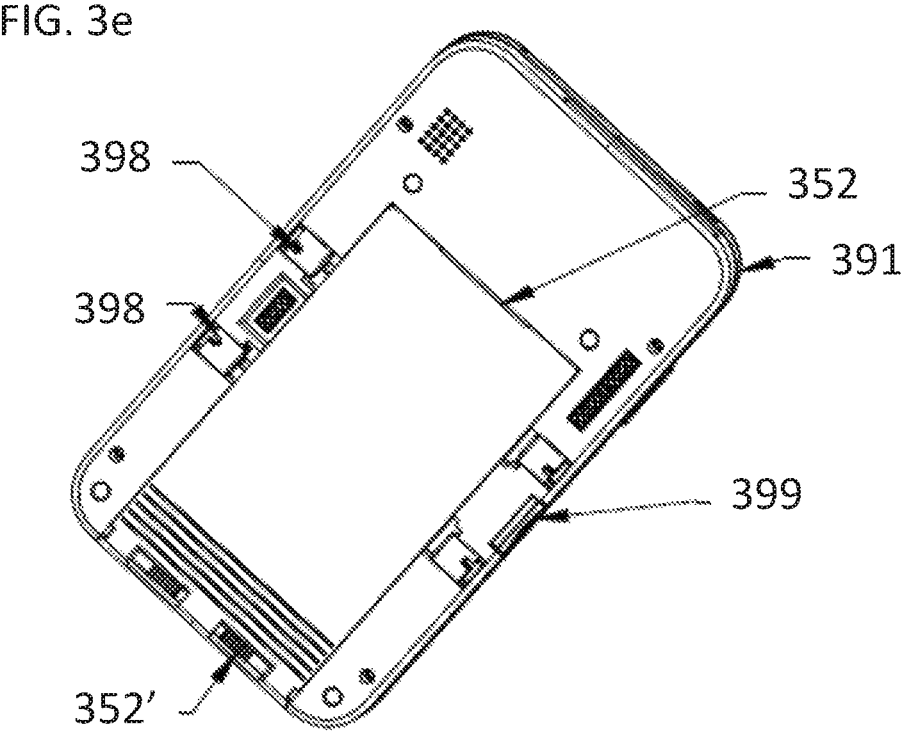
Figure 3F:
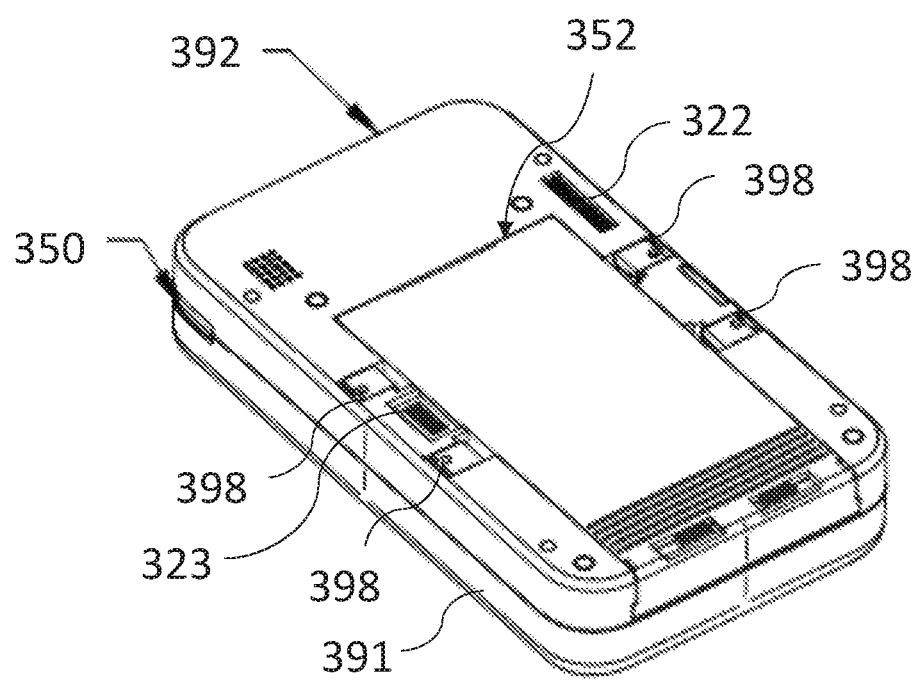
Figure 3G:
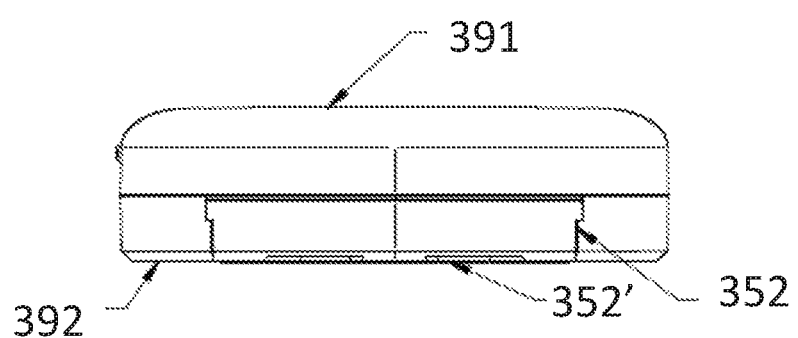

FIG. 3*a* is a top view of an embodiment of the mobile tablet adapted to be docked through a base mount universal receiver to a pistol grip base housing forming the Tablet Gun™ and operating in concert under the enterprise resource planning mobile application's environment, shown generally at 300. FIG. 3*b* is a back view of the embodiment of FIG. 3*a*. FIG. 3*c* is a first side view of the embodiment of FIG. 3*a*. FIG. 3*d* is a second side view of the embodiment of FIG. 3*a*. FIG. 3*e* is another back view of the embodiment of FIG. 3*a*. FIG. 3*f* is another back view of the embodiment of FIG. 3*a*. FIG. 3*g* is a bottom side view of the embodiment of FIG. 3*a*.

Referring to FIGS. 3*a*-3*g*, mobile tablet 300 is adapted to be mounted interchangeably on base assemblies, such as the pistol grip base housing forming the Tablet Gun™, other wearable assemblies, and/or fixed POS stations. Tablet 300 includes a bottom housing 392, top housing 391 with a display 343, side walls 393 and top and bottom walls 394 and 395, respectively. Preferably display 343 is composed of glass and capacitive touch, and is about 5.7" diagonally. Most preferably, display 343 ranges from 6" to 7" (approx.) diagonal and is a LCD touchscreen display. Display 343 includes Custom Retail Apps, System Apps and Firmware integrated within the Primary PCB running on Microsoft Windows OS currently known as Windows 10. A docking station interface connector 322 electronically connects and communicates through the tablet gun interface PCB (244 of FIG. 2*a*-2*h*) or an interface PCB integrated into another base frame. A pistol grip base housing interface connector 323 is provided for electronic connection and coupling to a pistol grip base housing. A main battery assembly 352 with battery latch 352' (FIG. 3*e*) is providing having an upper battery housing is provided at 356 (FIG. 3*b*), along with a lower battery housing 357 (FIG. 3*b*). A breakaway feature, keeper 398 and keeper spring 396 are provided for ready release of the mobile tablet 300 from the base frame/assembly providing protection especially when/if the tablet gun mobile device assembly is dropped. A volume button 397 is provided. A release button 399 is provided for releasing the mobile tablet 300 from the base frame. A MSR 350 is provided on the top wall of the mobile tablet 300.

Figure 4:
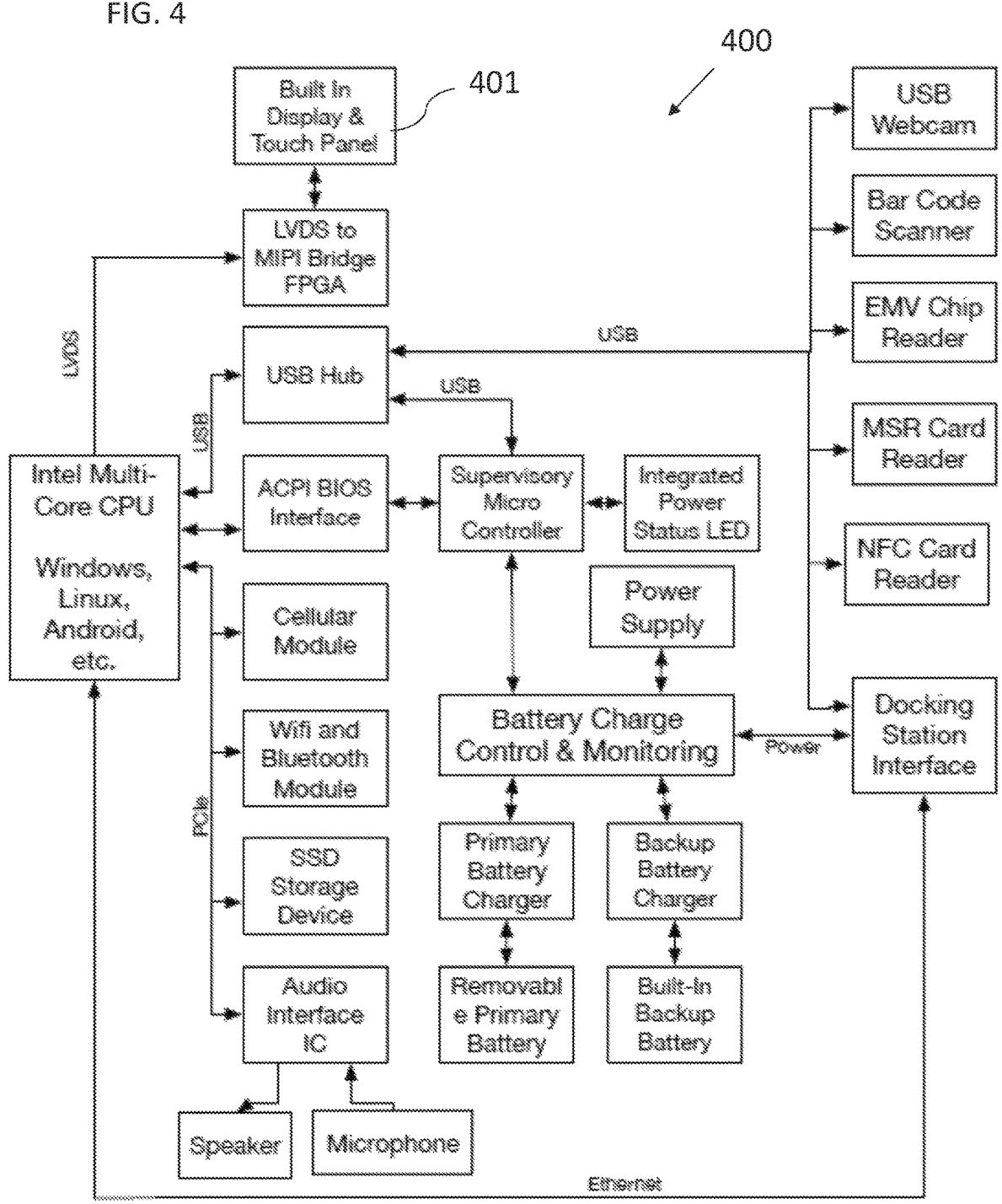
FIG. 4 is a functional block diagram of the subject mobile tablet gun system.

FIG. 4 is a functional block diagram of the subject mobile tablet gun system, shown generally at 400. The mobile tablet device includes a built in display and touch panel 401 in communication with Low-voltage differential signaling (LVDS) to MIPI Bridge FPGA.

Figure 5:
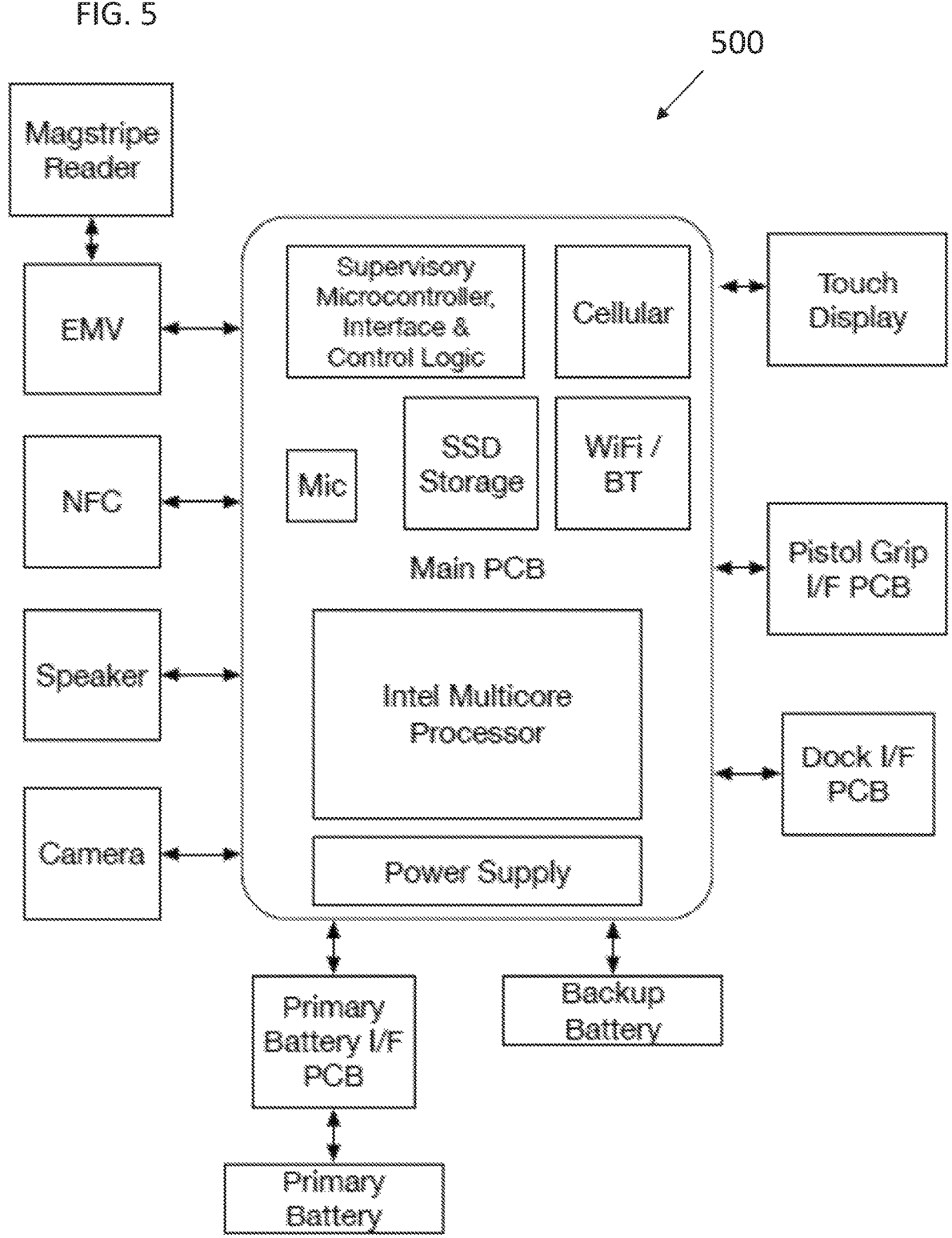
FIG. 5 is a schematic diagram illustrating mobile tablet printed circuit board (PCB) assemblies and interconnects.

FIG. 5 is a schematic diagram illustrating tablet printed circuit board (PCB) assemblies and interconnects, shown generally at 500. Arrows represent cable or contact to contact interconnects. PCBs shown embedded within others, such as on the main PCB, are either features of the PCB assembly, or have direct board to board interconnects.

Figure 6:
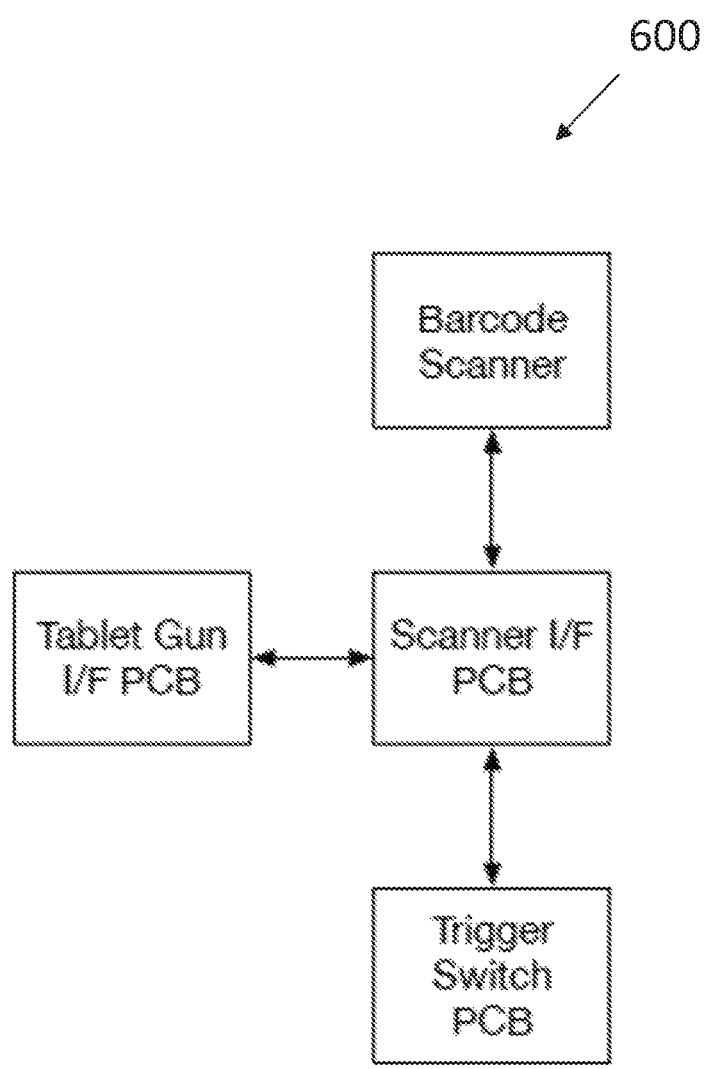
FIG. 6 is a schematic diagram illustrating the detachable pistol grip base housing PCB assemblies and interconnects.

FIG. 6 is a schematic diagram illustrating the detachable pistol grip base housing PCB assemblies and interconnects, shown generally at 600. Arrows represent cable or contact to contact interconnects.

An electrically erasable programmable read only memory (FIRMWARE) that has a previously programmed instruction set present within the Primary PCB. The schematic diagram of the circuit of the Primary PCB residing in the upper receiver. The FIRMWARE is shown at 801 (EEPROM) and is connected to the mobile tablet device at 202 and can process the command issued by the mobile applications to command either the USB barcode scanner or the EMV/MSR reader to acquire required data. The mobile tablet device has several mobile applications accessed by icons on the mobile tablet device screen and has functionality to communicate via Ethernet or wirelessly via Wi-Fi or wireless cellular with a POS Store or Cloud Server or directly to the corporate ERP system depending on the particular mobile application and function and this communication is secured using standard WPA or WPA2 wireless encryption methods. When the payment card transaction is approved by the bank card issuing authority through the bank card processor via PCI certified network connection, the appropriate encrypted payment card information is wirelessly transmitted via an encrypted communication to the POS Store or Cloud Server within the store. Unless credit is denied, the purchase is authorized and is sent to the mobile tablet device display screen for customer signature using an integrated signature capture application built within the mobile POS application on the mobile tablet device and the customer is given the purchased merchandise. The receipt for this purchase can be printed on the store network and/or sent by e-mail to the customer. The POS Store or Cloud Server sends a request to the ERP system to update the appropriate allocated inventory for merchandise sold regardless of the inventory fulfillment location. The ERP system processes that request and updates the corporate inventory databases, which are accessible chain-wide.

Due to the use of the FIRMWARE, which can process barcode and payment card data, the attached mobile tablet device can perform secure distributed sales within a retail establishment. Through the mobile POS application, all store employees know instantaneously the available inventory of any particular item across the chain; any product and its particular details can be reviewed with the customer and sold regardless of the products availability in the store ringing the sale. Thus a customer may look at a variety of products and ask the salesperson its price, detailed product description, electronic and physical coupons, promotions and customer loyalty data and rewards that are available to the customer. This provides a friendly, efficient and informative interaction between the customer and the retail salesperson; it establishes a one-on-one face-to-face relationship, which is appreciated by the customer and is conducive to an improved sales environment.

Figure 7A:
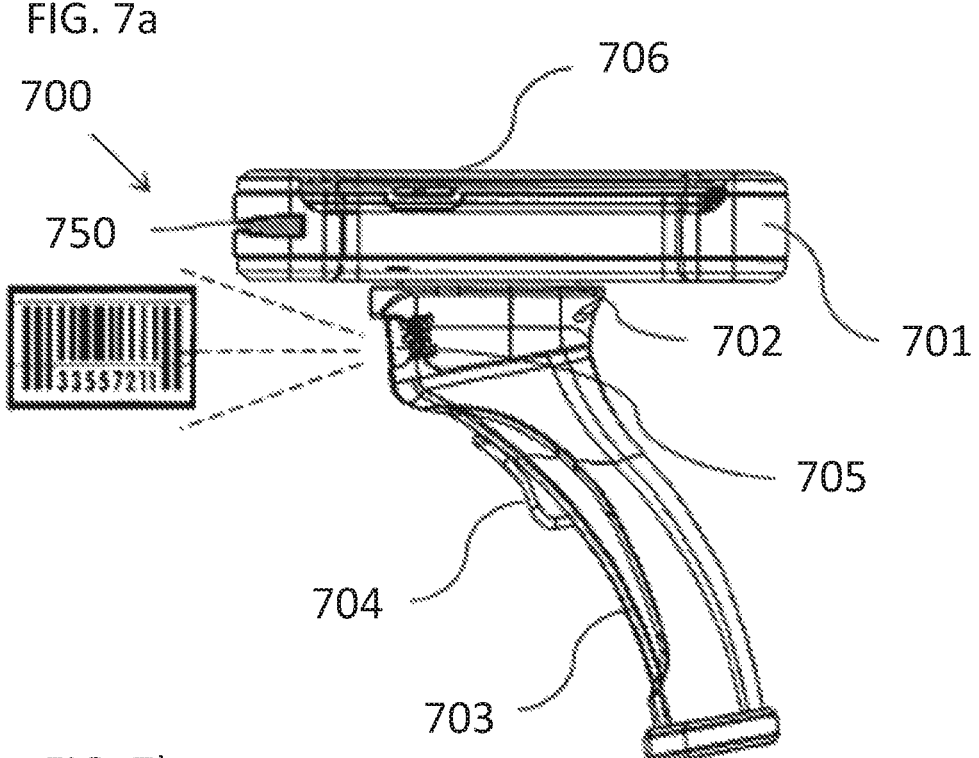
FIG. 7a is a side-view drawing of an embodiment of the mobile tablet gun system docked through a base mount universal receiver with rotational coupling to a pistol grip base housing operating in concert under the enterprise resource planning mobile application's environment.
Figure 7B:
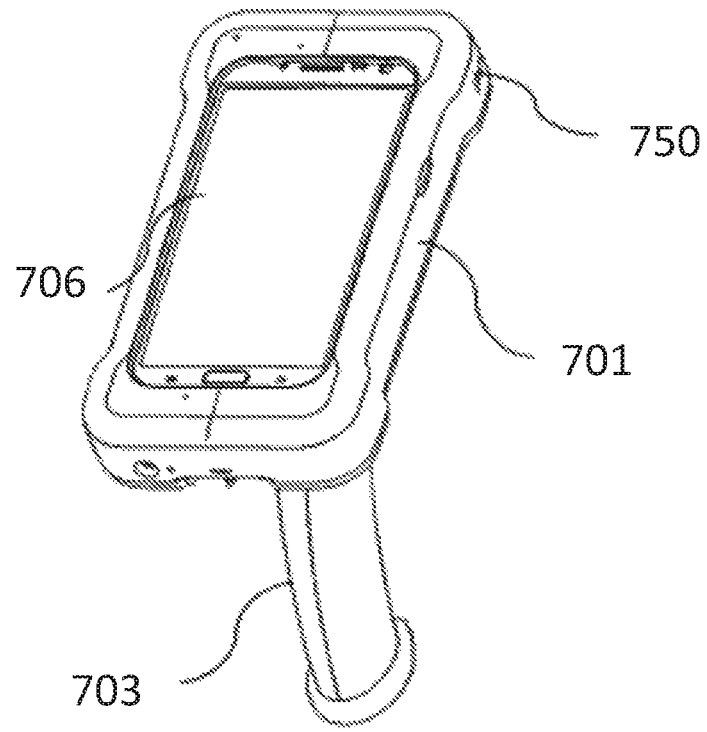

FIGS. 7*a* and 7*b* illustrate a first embodiment of the subject mobile tablet gun system with integration of a mobile tablet device and pistol grip base housing operational with the system and method, shown generally at 700. FIG. 7*a*, shows side-view while FIG. 7*b* shows a top-side view of the device. The mobile tablet gun system is shown generally at 700 in FIGS. 7*a* and 7*b*. Referring to FIGS. 7*a* and 7*b*, the mobile tablet gun system 700 has a mobile tablet device 701 attached to a base mount universal receiver with rotatable coupler 702, which permits the alignment of the mobile tablet device in the portrait or landscape mode. The figure shows the mobile tablet device in portrait mode. A plurality of applications is present in the mobile tablet device display screen 706. The mobile tablet gun system has a gun handle 703 with a trigger 704, which activates the barcode scanner 705. Preferably, an MSR slot 750 for carrying-out payment card transactions is present on the short edge of the mobile tablet device 701. In landscape mode, the MSR 750 is perpendicular to the scanner in portrait mode, the MSR 750 is parallel to the scanner as shown in FIG. 7*a*. The base mount universal receiver with rotational coupler 702 is connected by a groove slide mechanism on the back side of the mobile tablet device 701 and is also not visible in this figure since it is incorporated within the rotatable connection between the mobile tablet device and the pistol gun base housing.

There are a number of specifically designed programmed applications that allow the mobile tablet device to command the USB input devices through the specialized universal serial bus wiring harness to perform various functions typical to scanner operations and MSR operations. Running of the specially programmed mobile POS application, StoreMobile POS™ is initiated and a command is sent to the EEPROM to acquire a barcode scan. The mobile tablet device in this mode is ready to receive the barcode data from the USB scanner input device and communicates with the POS store systems server at the retail facility and the corporate ERP system to obtain specific product information such as, product availability within the store and chain, price and any promotions available, available physical and electronic coupons and customer loyalty information. The employee of the retail organization presents the data that is related to the particular item of interest to the customer. When the customer decides to purchase the particular item scanned, the employee of the retail organization uses the mobile POS application to process the sales transaction, if needed for shipping, pertinent customer information is entered or records updated if they are already a loyalty rewards customer. At tender, this POS transaction can open the cash drawer wirelessly for cash transactions and can also launch a request for processing the sale using a customer payment card. The customer's payment card is swiped via the USB MSR input device, which is located on the short edge of the mobile tablet device. All pertinent customer payment card data is encrypted by the MSR and the EEPROM communicates the encrypted data through the specialized universal serial bus wiring harness to the mobile tablet device.

The mobile POS application, StoreMobile POS™, present in the mobile tablet device communicates all pertinent customer payment card data, using a PCI compliant encrypted Wi-Fi connection or wireless cellular connection, to the POS store systems server. The POS store systems server contacts the bank card processor through a PCI certified network connection for payment card authorization for the purchase. If the purchase is authorized, this information is sent to the mobile tablet device display screen for customer signature using an integrated signature capture application built within the mobile POS application on the mobile tablet device and the customer is allowed to take possession of the merchandise purchased. The POS store systems server can send a receipt for the purchase to the e-mail address of the customer if desired. The POS store systems server records this purchase and instructs the corporate ERP system to adjust the inventory data for the particular item sold, becoming visible chain-wide. A hard copy of the receipt can also be printed in a central printer present in the retail establishment. If the credit purchase is denied, the mobile tablet device displays this credit request decline. The employee of the retail organization informs the customer of this credit purchase rejection and requests another form of payment. Thus the purchase of merchandise by a customer is accomplished by StoreMobile POS™ by an employee having a mobile tablet gun system anywhere in the store or beyond the store, without the customer having to bring the merchandise to a sales counter and wait in line to consummate the purchase; and, the inventory of any item in the retail establishment is always current and available for purchase transactions carried out by a plurality of sales personnel working with a plurality of customers at a wide variety of locations within the retail establishment.

Figure 8:
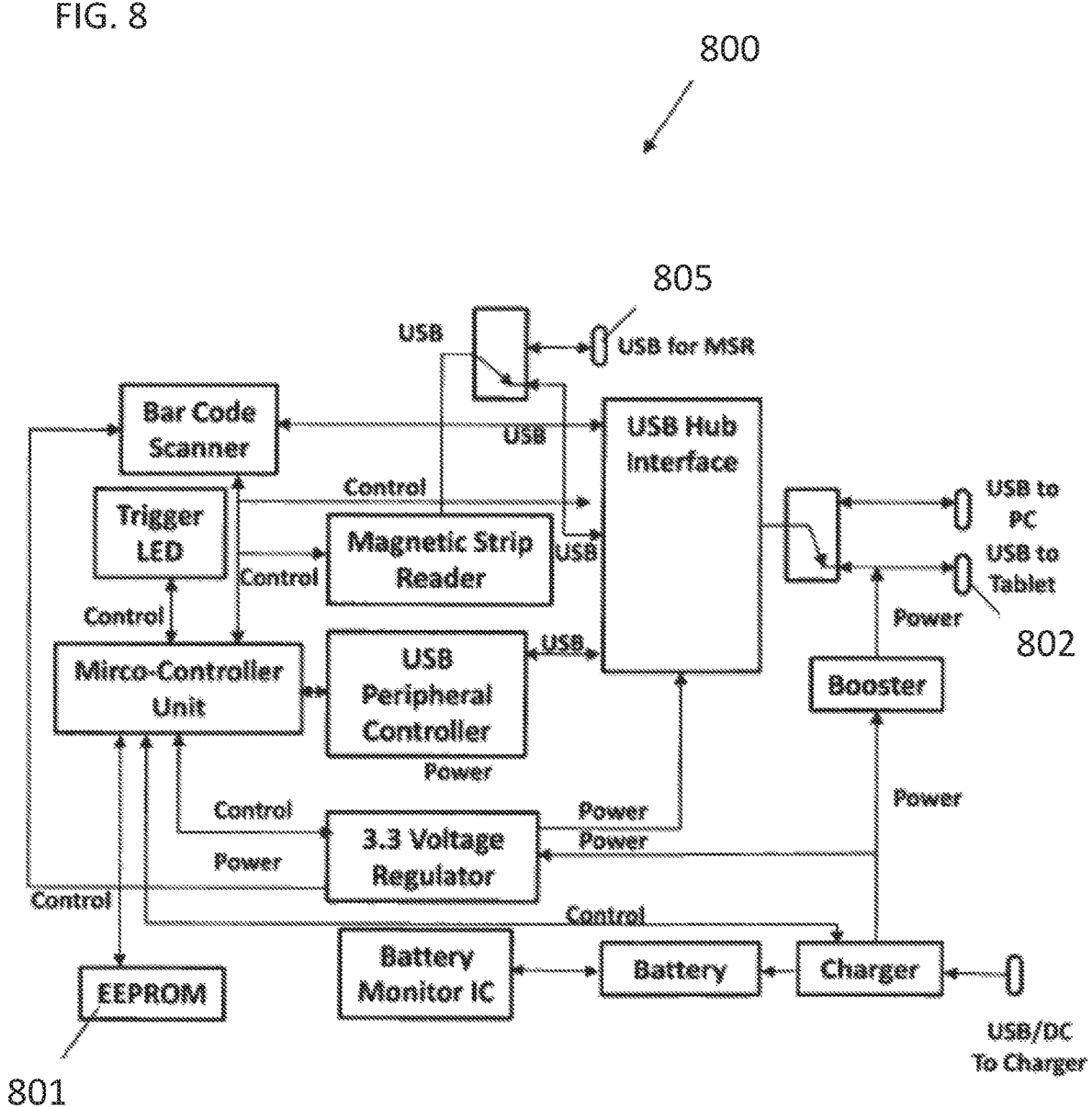
FIG. 8 is a schematic diagram illustrating an embodiment of the circuit of the Main PCB residing in the mobile tablet housing.

A key feature of the invention is an electrically erasable programmable read-only memory (EEPROM) that has a previously programmed (FIRMWARE) instruction set present within the Primary PCB. The schematic diagram of the circuit of the Primary PCB residing in the upper receiver is shown in FIG. 8 at 800. The EEPROM is shown at 801 and is connected to the mobile tablet device at 802 and can process the command issued by the mobile applications to command either the USB barcode scanner or the MSR/EMV/NFC input devices to acquire required data. The mobile tablet device has variety of mobile applications including systems applications, ERP applications, standard and custom retail applications accessed by icons on the mobile tablet device screen and has functionality to communicate wirelessly via Wi-Fi or wireless cellular with a POS store systems server or directly to the corporate ERP system depending on the particular mobile application and function and this communication is secured using standard WPA or WPA2 wireless encryption methods. When the payment card transaction is approved by the bank card issuing authority through the bank card processor via PCI certified network connection, the appropriate encrypted payment card information is wirelessly transmitted via an encrypted communication to the POS store systems server within the store. Unless credit is denied, the purchase is authorized and is sent to the mobile tablet device display screen for customer signature using an integrated signature capture application built within the StoreMobile POS™ application on the mobile tablet device and the customer is given the purchased merchandise. The receipt for this purchase can be printed on the store network and/or sent by e-mail to the customer. The POS store systems server sends a request to the ERP system to update appropriate allocated inventory for merchandise sold regardless of the inventory fulfillment location. The ERP system processes that request and updates the corporate inventory databases, which are accessible chain-wide.

Due to the integration between the Retail Apps and the FIRMWARE, which can process barcode and payment card data, the attached mobile tablet device can perform secure distributed sales within a retail establishment. Through the StoreMobile POS™ application, all store employees know instantaneously the available inventory of any particular item across the chain; any product and its particular details can be reviewed with the customer and sold regardless of the products' availability in the store ringing the sale. Thus a customer may look at a variety of products and ask the salesperson its price, detailed product description, electronic and physical coupons, promotions and customer loyalty data and rewards that are available to the customer. This provides a friendly, efficient and informative interaction between the customer and the retail salesperson; it establishes a one-on-one face-to-face relationship, which is appreciated by the customer and is conducive to an improved sales environment.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A mobile tablet gun system for interchangeably attaching and electronically coupling a mobile tablet device to a base form factor, wherein:
   a) said base form factor has a base mount universal receiver integrated with a rotational coupling unit connected to an interface printed circuit board (P.C.B.) located on said base form factor for interchangeably mounting and electronically communicating with said mobile tablet device and providing rotatable connection between said mobile tablet device and said base form factor, and said base mount universal receiver with rotational coupling is located between said mobile tablet device and said base form factor, b) said base form factor has a bar code scanner and bar code scanner interface P.C.B. in communication therewith, and said base form factor includes a trigger adapted to activate said bar code scanner;

c) said mobile tablet device has a top housing with a display and a bottom housing, mobile application software and a Primary Printed Circuit Board (P.C.B.) for processing commands for running real-time custom retail applications, system applications and firmware executable on a Microsoft Windows operating system (O.S.) adapted to be connected to said base form factor through said base mount universal receiver and capable of receiving substantially the same remote Windows Updates as an industry-standard tablet, laptop or desktop point of sale (P.O.S.) terminal;

d) said mobile tablet device has one or more docking station P.C.B. interface connectors located on said bottom housing of said mobile tablet device for mounting and electronically connecting said mobile tablet device to said base form factor through said base mount universal receiver with said rotational coupling unit;

e) aid mobile tablet device has a battery assembly having one or more batteries;

f) said mobile tablet device has a universal serial bus (USB) payment card reader supporting a Magnetic Strip Reader (M.S.R.) and a Europay MasterCard Visa (E.M.V.) payment card reader for executing point of sale (P.O.S.) transactions and real-time daily chain store-level inventory management functions for such tasks as physical inventory, cycle counting, inventory receiving, store to store transfers, return to vendor, and product re-ticketing;

g) said mobile tablet device has a Near Field Communications (N.F.C.) USB module for executing "tap and go" contactless point of sale (P.O.S.) transactions and real-time daily chain store-level inventory management functions for such tasks as physical inventory, cycle counting, inventory receiving, store to store transfers, return to vendor, and product re-ticketing; and h) said mobile tablet gun system instantly and seamlessly migrates between a variety of form factors, including a fixed P.O.S. terminal, a Wi-Fi handheld terminal and a cellular handheld terminal, enabling sales associates to service their customers without disruption of work flow or disruption of a P.O.S. transaction.

2. The mobile tablet gun system as recited by claim 1, wherein said battery assembly comprises a primary battery and an integrated backup battery.

3. The mobile tablet gun system as recited by claim 1, wherein said base form factor is one or more of a mobile tablet assembly and fixed P.O.S. terminal.

4. The mobile tablet gun system as recited by claim 3, wherein said form factor is a mobile tablet gun.

5. The mobile tablet gun system as recited by claim 3, wherein said form factor is a wearable scanner gun assembly.

6. The mobile tablet gun system as recited by claim 3, wherein said form factor is a fixed P.O.S. terminal.

7. The mobile tablet gun system as recited by claim 1, wherein said base mount universal receiver with rotatable coupling includes a breakaway feature comprising a breakaway device having a keeper and a keeper spring engageable for ready release of said mobile tablet device from said base form factor.

8. The mobile tablet gun system as recited by claim 1 comprising a release button for releasing said mobile tablet device from said base form factor.

9. The mobile tablet gun system as recited by claim 1, wherein said operating system is a Microsoft Windows 10 O.S.

10. The mobile tablet gun system as recited by claim 1, wherein said display is composed of glass and capacitive touch.

11. The mobile tablet gun system as recited by claim 1, wherein said display is a touchscreen liquid-crystal display (LCD) and is at least 5.7 inches.

12. The mobile tablet gun system as recited by claim 1, wherein said Primary P.C.B. is capable of commanding and controlling a USB barcode scanner input device having a scanner trigger for activating a scan operation by an employee of a retail establishment and retrieving an inventory item for wide variety of Retail App functions and processes.

13. A mobile tablet device adapted to be removably attached and electronically coupled through a base mount universal receiver to one or more base form factor, comprising:

a) said mobile tablet device having a bottom housing, top housing with a display, and side walls;

b) a Primary Printed Circuit Board (P.C.B.) to process commands for running custom retail applications, system applications and firmware executable on a Microsoft Windows operating system (O.S.) adapted to be connected to said base form factor through said base mount universal receiver and capable of receiving substantially the same remote Windows Updates as an industry-standard tablet, laptop or desktop point of sale (P.O.S.) terminal;

c) one or more docking station P.C.B. interface connectors located on said bottom housing of said mobile tablet device adapted to mount said mobile tablet device on said base form factor and electronically connecting to and communicating with said base form factor through an interface P.C.B. of said base form factor;

d) a battery assembly having one or more batteries;

e) a USB payment card reader supporting a Magnetic Strip Reader (M.S.R.), a Europay MasterCard Visa (E.M.V.) payment card reader and a Near Field Communications (N.F.C.) "tap and go" payment Module;

f) said mobile tablet device executing point of sale (P.O.S.) transactions and real-time daily chain store-level inventory management functions for such tasks as physical inventory, cycle counting, inventory receiving, store to store transfers, return to vendor, and product re-ticketing; and g) said mobile tablet device instantly and seamlessly migrates between a variety of form factors, including a fixed P.O.S. terminal, a Wi-Fi handheld terminal and a cellular handheld terminal, enabling sales associates to service their customers without disruption of work flow or disruption of a P.O.S. transaction.

14. The mobile tablet device as recited by claim 13, wherein said base mount universal receiver has rotational coupling.

15. The mobile tablet device as recited by claim 13, wherein said battery assembly comprises a primary battery and an integrated backup battery.

16. The mobile tablet device as recited by claim 13, wherein said mobile tablet device is capable of being interchangeably mounted on one or more of said base form factor comprising a mobile tablet assembly and fixed P.O.S. terminal through said base mount universal receiver having rotational coupling.

17. The mobile tablet device as recited by claim 13, wherein said docking station P.C.B. interface connector is located on a bottom wall of said bottom housing and is adapted to electronically connect and communicate through said interface P.C.B. of said base form factor.

18. The mobile tablet device as recited by claim 13 comprising a release button for releasing said mobile tablet device from said base mount universal receiver and said base form factor.

19. The mobile tablet device as recited by claim 13, wherein said operating system is a Microsoft Windows 10 O.S.

20. The mobile tablet device as recited by claim 13, wherein said display is composed of glass and capacitive touch.

21. The mobile tablet device as recited by claim 13, wherein said display is a touchscreen liquid-crystal display (LCD) and is at least 5.7 inches.

22. The mobile tablet device as recited by claim 13, wherein said display is an LCD touchscreen display ranging from about 6 inches to 7 inches diagonal and having said system apps and firmware integrated within said Primary P.C.B. running on Microsoft Windows O.S. operating on a Mobile Industry Processor Interface (MIPI) video signal interface powered by an Intel Atom dual-core processor designed for use with a Low Voltage Display Signal (LVDS) video signal interface.

23. The mobile tablet device as recited by claim 13 comprising wireless networking capability selected from a group consisting of Wi-Fi, Bluetooth, and wireless network carrier services.

24. The mobile tablet device as recited by claim 13 comprising accelerometer control for display orientation by application, battery and processor temperature monitoring, color-coded battery power metering and charging schemas for a primary and backup lithium-ion battery pack, processor "sleep mode" management for optimizing battery life and quick return of system availability, Advanced Configuration and Power Interface (ACPI) BIOS integration from Intel Atom Processor to Windows O.S.

25. The mobile tablet device as recited by claim 13, wherein said Primary P.C.B. is capable of commanding and controlling a USB barcode scanner input device having a scanner trigger for activating a scan operation by an employee of a retail establishment and retrieving an inventory item for a wide variety of Retail App functions and processes.

26. A mobile tablet gun for processing a retail store point of sale (P.O.S.) transactions, comprising:
   a) a handle portion having a top wall with a rotational coupling unit thereon, said coupling unit comprising a rotation stopping plate, rotation stop plate and rotation base plate;
   b) a base mount universal receiver integrated within said rotational coupling unit, wherein said base mount universal receiver within said rotational coupling unit includes an interface printed circuit board (P.C.B.) and is adapted to interchangeably mount and electronically communicate with a docking station P.C.B. interface connector of a mobile tablet device having a Microsoft Windows 10 operating system (O.S.) integrated therein that is capable of receiving substantially the same remote Windows Updates as an industry-standard tablet, laptop or desktop point of sale (P.O.S.) terminal and enables store level real-time inventory management and a fully functioning P.O.S. capability for selling merchandise in a retail sales environment;
   c) said base mount universal receiver with rotational coupling unit allows conversion of said mobile tablet device from portrait mode to landscape mode without operational delay of said system;
   d) a bar code scanner and bar code scanner interface P.C.B. in communication therewith;
   e) a trigger adapted to activate said barcode scanner; and
   f) said mobile tablet gun instantly and seamlessly migrating between a variety of form factors, including a fixed P.O.S. terminal, a Wi-Fi handheld terminal and a cellular handheld terminal, enabling sales associates to service their customers without disruption of work flow or disruption of a P.O.S. transaction.

27. The mobile tablet gun system as recited by claim 26, wherein said handle portion is formed from a front grip mated with a rear grip, said rear grip having said top wall, handle side walls and a bottom lanyard formed as an integral unilateral unit/one-piece unit.

28. The mobile tablet gun system as recited by claim 26, wherein said base mount universal receiver with rotatable coupling includes a breakaway feature comprising a breakaway device having a keeper and a keeper spring engageable for ready release of said mobile tablet device from said base form factor.

29. A mobile tablet gun system method for interchangeably attaching and electronically coupling a mobile tablet device to a base form factor, comprising the steps of:
   a) attaching and electronically coupling said mobile tablet device on said base form factor through a base mount universal receiver integrated with a rotational coupling unit connected to an interface printed circuit board (P.C.B.) located on said base form factor, said base mount universal receiver with said rotational coupling unit allowing conversion of said mobile tablet device from a portrait mode to a landscape mode without operational delay;
   b) electrically initiating a bar code scanner and bar code scanner interface P.C.B. in communication therewith located in said base form factor, and wherein said base form factor includes a trigger adapted to activate said bar code scanner;
   c) processing commands on a display of said mobile tablet device, said mobile tablet device having mobile application software and a Primary Printed Circuit Board (P.C.B.) for running real-time custom retail applications, system applications and firmware executable on a Microsoft Windows 10 operating system (O.S.) capable of receiving substantially the same remote Windows Updates as an industry-standard tablet, laptop or desktop point of sale (P.O.S.) terminal;
   d) mounting said mobile tablet device to said base form factor through one or more docking station P.C.B. interface connectors located on said bottom housing of said mobile tablet device for mounting and electronically connecting said mobile tablet device to said base form factor through said base mount universal receiver integrated with a rotational coupling unit and breakaway features;
   e) supporting a Magnetic Strip Reader (M.S.R.), a Europay MasterCard Visa (E.M.V.) payment card reader through a universal serial bus (USB) payment card reader;
   f) supporting a Near Field Communications (N.F.C.) "tap and go" USB payment module;

for executing point of sale (P.O.S.) P.O.S. transactions and real-time daily chain store-level inventory management functions for such tasks as physical inventory, cycle counting, inventory receiving, store to store transfers, return to vendor, and product re-ticketing; and g) instantly and seamlessly migrating between a variety of form factors, including a fixed P.O.S. terminal, a Wi-Fi handheld terminal and a cellular handheld terminal, enabling sales associates to service their customers without disruption of work flow or disruption of a P.O.S. transaction.

* * * * *